(12) United States Patent
Lusk et al.

(10) Patent No.: US 7,862,101 B2
(45) Date of Patent: Jan. 4, 2011

(54) COMPOSITE BODY FOR A VEHICLE

(75) Inventors: Kevin Lusk, Gimli (CA); Kenneth S. Church, St. Andrews (CA); William H. Stanton, Winnipeg (CA)

(73) Assignee: Faroex Ltd., Gimli, Manitoba (CA)

( * ) Notice: Subject to any disclaimer, the term of this patent is extended or adjusted under 35 U.S.C. 154(b) by 587 days.

(21) Appl. No.: 11/782,083

(22) Filed: Jul. 24, 2007

(65) Prior Publication Data

US 2008/0036240 A1 Feb. 14, 2008

Related U.S. Application Data

(63) Continuation-in-part of application No. PCT/CA2006/001534, filed on Sep. 20, 2006.

(60) Provisional application No. 60/738,032, filed on Nov. 21, 2005.

(51) Int. Cl.
  *B60J 7/00* (2006.01)
(52) U.S. Cl. .............. 296/178; 296/210; 296/193.05; 296/193.07; 296/203.03; 296/29
(58) Field of Classification Search ............. 296/178, 296/210, 190.1, 193.05, 193.07, 201, 203.03, 296/204, 205, 29; 105/397
See application file for complete search history.

(56) References Cited

U.S. PATENT DOCUMENTS

| | | | |
|---|---|---|---|
| 4,059,303 A | 11/1977 | Mauri | |
| 4,230,361 A * | 10/1980 | Nachbur et al. | 296/30 |
| 4,254,987 A * | 3/1981 | Leonardis | 296/178 |
| 5,042,395 A | 8/1991 | Wackerle | |
| 5,140,913 A | 8/1992 | Takeichi | |
| 5,433,151 A | 7/1995 | Ohara | |
| 5,577,793 A * | 11/1996 | Kobasic | 296/146.4 |
| 5,904,972 A | 5/1999 | Tunis | |
| 5,918,548 A | 7/1999 | Elsner | |
| 5,997,075 A | 12/1999 | Dunder | |
| 6,065,261 A | 5/2000 | Fehr | |
| 6,237,989 B1 * | 5/2001 | Ammerlaan et al. | 296/178 |
| 6,685,254 B2 | 2/2004 | Emmons | |

FOREIGN PATENT DOCUMENTS

| | | |
|---|---|---|
| EP | 0 622285 | 11/1994 |
| EP | 1495948 | 1/2005 |
| WO | WO/04/000633 | 12/2003 |
| WO | WO/04/000634 | 12/2003 |

\* cited by examiner

*Primary Examiner*—Joseph D Pape
(74) *Attorney, Agent, or Firm*—Adrian D. Battison; Ade & Company Inc.

(57) ABSTRACT

A vehicle primarily a mass transit vehicle is formed primarily of composite materials which define a roof section and a floor section of two fiber reinforced sheets connected by an integral core and two rigid side wall sections each formed from welded steel or optionally bolted aluminum defining a series of window openings in a row along the side wall section in a ladder shape. The separate sections are connected to a front end cap and a rear end cap. Mountings for the seats are defined as well as conduits through the floor and roof for electrical and fluid connections. Releasable joints of adhesive are provided between the metal rails and the edges of the composite panels.

17 Claims, 17 Drawing Sheets

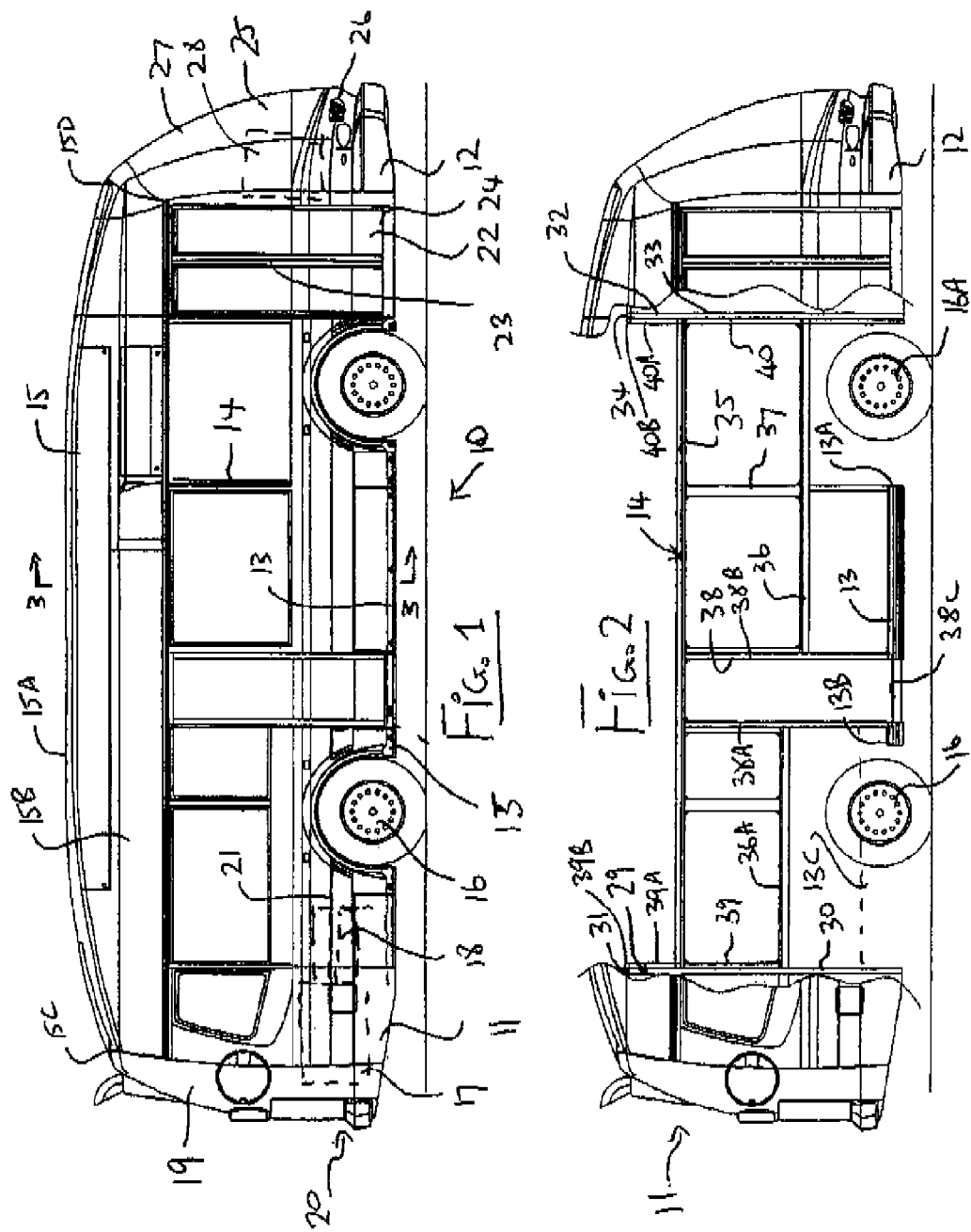

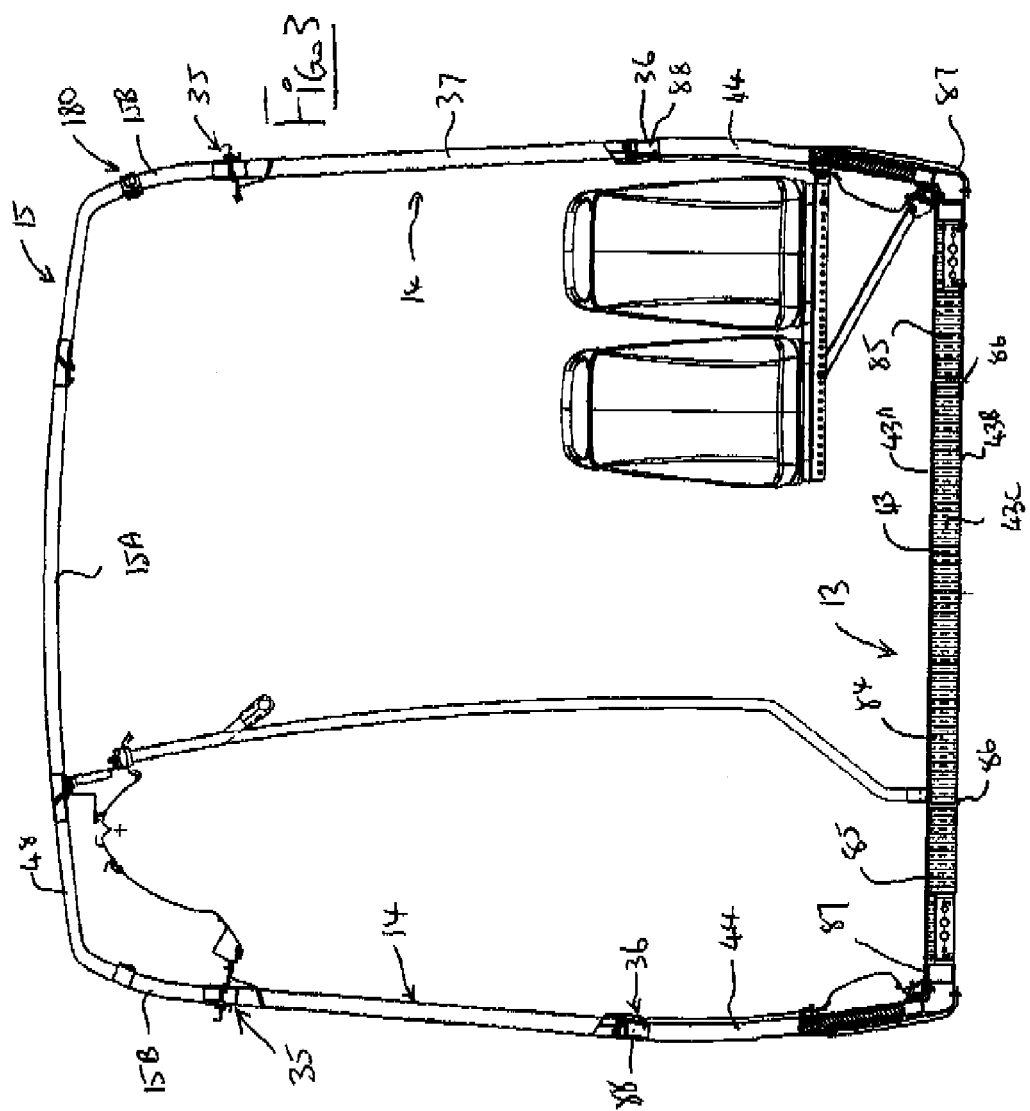

COMPOSITE BODY FOR A VEHICLE

This application is a continuation-in-part of PCT Application PCT/CA2006/001534 filed 20 Sep. 2006.

This application claims the benefit under 35 U.S.C. 119 of Provisional Application 60/738,032 filed Nov. 21, 2005.

This invention relates to a body structure of a vehicle which uses fiber reinforced composite materials at least as part of the structure.

BACKGROUND OF THE INVENTION

There has been an intention in the industry of mass transit vehicles to provide a vehicle body which is formed primarily of a composite material. Such composite materials generally comprise fibreglass reinforced resin sheets and often these are formed with a foam or other core layer between the sheets. The primary intention is that the structure be formed substantially wholly from such composite materials. The intention is that such materials will reduce weight and provide a superior corrosion resistance. One technique is to provide molds in which the body is shaped and formed from separate pieces which can then be connected together. However one highly desirable feature is that the structure can provide multiple different vehicle lengths to satisfy customer demands.

A number of attempts have been made for example, by Northrup Grumman Corporation's Advanced Technology Transit Bus (ATTB) North American Bus Industries (NABI) and TPI Structural Composites who provided 40 and 45 feet length "Compobus (withdrawn from the market after limited release) a proposal by ABI, a proposal by TPI Structural Composites under the trade name "Airporter", a proposal by Stork Fokker AESP Aerospace Group, Duvedec international and den Oudsten Bussen by (FX026), and a proposal by Duvedec International. However these proposals have been put forward in a manner that does not fully address one or more of the critical market entry or performance criteria resulting in a vehicle that has limited appeal or cannot meet the rigorous performance standards dictated by the transit agencies. In Europe, where road maintenance is superior relative to North America, durability is less of a concern, and the limited recycleability of molded fibreglass uni-bodies, there has been limited interest in lightweight composite vehicles. Stork Fokker and den Oudsten Bussen by in partnership with Duvedec International created the RETX-98 which was to enter revenue service in Rotterdam, but aside from stirring momentary interest at a few shows, the Advanced Lightweight Modular (AILMO) vehicle could not save the company from bankruptcy. The Stork Fokker AILMO body technology was licensed to APT Systems in Helmond NL which was incorporated into the Phileas, which has achieved limited success, mostly in Bus Rapid Transit systems. The license for the Stork Fokker AILMO body technology is held in North America by New Flyer Industries Ltd but this again has achieved no commercial success.

One of the defining criteria is vehicle length. The market requires vehicles under 29 feet in length, 30 to 35 feet and 40 feet and 45 feet commuters together with 60 and even 80 feet articulated vehicles. All previous attempts can be divided into two categories: one set of molds for each body length or various body lengths created by ganging modules. The multiple mold strategy of course provides a huge tooling expense. The AILMO multiple module technique is dependent on the side windows being bonded to the body, thus functioning as a structural component. This approach has inherent weaknesses, not the least of which is that North American regulations require at least 4 of the windows on a bus to open for emergency escape.

Up till now, therefore, no commercial vehicle of this type has been successfully exploited.

It will be appreciated that body structures of this type can be deployed either as a light rail vehicle or as a road vehicle and many common features can be used in both structures. There are of course significant differences which will be well known to one skilled in the art but the principle set forth in the present application can in most cases be used in both fields.

A number of prior patents have been published showing features of the above mentioned commercial attempts and showing various other arrangements by other parties interested in this field.

The following patents have been noted as having some relevance in the present field U.S. Pat. No. 4,059,303 (Mauri) issued Nov. 22, 1977.
U.S. Pat. No. 5,042,395 (Wackerle) issued Aug. 27, 1991.
U.S. Pat. No. 5,140,913 (Takeichi) issued Aug. 25, 1992.
U.S. Pat. No. 5,433,151 (Ohara) issued Jul. 18, 1995.
U.S. Pat. No. 5,904,972 (Tunis) issued May 18, 1999.
U.S. Pat. No. 5,918,548 (Elsner) issued Jul. 6, 1999.
U.S. Pat. No. 5,997,075 (Dunder) issued Dec. 7, 1999.
U.S. Pat. No. 6,065,261 (Fehr) issued May 23, 2000.
U.S. Pat. No. 6,237,989 (Ammerlaan) issued May 29, 2001.
U.S. Pat. No. 6,685,254 (Emmons) issued Feb. 3, 2004.
PCT Publication No. WO/2004/000633 and 000634 assigned to NABI published 31 Dec. 2003.
EP Application 0 622 285 published Nov. 2, 1994 and assigned to GEC Alsthom Transport SA.

Mauri discloses a conventional vehicle using a fabricated frame clad by covering panels.

Wackerle discloses a rail vehicle formed from molded upper section defining the side walls and roof connected to a floor section. The connection is provided by a corner piece which is bonded into an edge piece at each edge of each molded composite panel. The composite panels are formed from exterior sheets with a honey comb core between.

Takeichi discloses a rail vehicle which is similarly constructed to the above except that it is formed in sections which are connected edge to edge along the length of the vehicle. The floor sections are formed from side beams and horizontal rails.

Ohara discloses a similar arrangement.

Tunis discloses a technique for forming large composite core structures by vacuum assisted resin transfer molding. This is not particularly directed to vehicles but provides a technique which can form the large molded sections.

Elsner discloses a rail vehicle formed by connected beams.

Dunder disclose a vehicle where panels are connected together by insertion of an edge of a panel into a channel of the structural rail.

Fehr disclose a joint between a metal sandwich panel and a metal rail which uses welding to provide a seal.

Ammerlaan discloses the arrangement of the Stork Fokker AILMO device described above which it defines as a structure formed by connected, molded side panels, roof and floor sections where the drive components for the vehicle are bolted under the aluminum honeycomb floor. It is interesting to note that in its application to the APTS Phileas, the structure required internal cross bracing not cited in the patent to achieve the required torsional stiffness.

Emmons discloses a vehicle which is primarily formed from a roof section and a floor section together with vertical beams where the roof and floor sections are formed as a sandwich panel defined by the fibre reinforced sheets and an interconnecting core.

The two PCT applications of NABI disclose a molded structure in which the body and floor are separately molded from fibre reinforced plastics material. This is substantially based on the ATTB by Northrup Grumman Corporation.

The EP application of GEC a rail car formed of composite material where there is a channel-shaped roof section and corresponding channel-shaped floor section which butt together along the side walls.

SUMMARY OF THE INVENTION

It is one object of the invention to provide an improved composite vehicle.

According to a first aspect of the invention there is provided a vehicle comprising:

a roof defined by at least one roof section;

a floor defined by at least one floor section;

two side wall sections each defining a series of window openings in a row along the side wall section;

each side wall section comprising a generally an integral substantially rigid metal ladder structure defined by vertical posts and horizontal rails with openings in the ladder structure between at least some of the posts and some of the rails defining the window openings;

a front end section;

and a rear end section;

said at least one roof section comprising a structural member which is generally of inverted channel shape to define a generally horizontal roof portion and two depending cove portions, one on each side of the roof portion;

said at least one roof section being formed at least primarily from inner and outer fiber reinforced sheets containing a core material therebetween formed into an integral structure by a resin material therein;

said at least one floor section defining a structural member which is generally channel shaped to define a generally horizontal floor portion and two generally upstanding wall portions, one on each side of the floor portion;

at least the floor portion of said at least one floor section being formed at least primarily from inner and outer fiber reinforced sheets containing a core material therebetween formed into an integral structure by a resin material therein;

a top edge of each wall portion being attached by a respective adhesive structural connection to a bottom rail of the respective one of the side wall sections such that structural loads in the vehicle are communicated between said at least one floor section and the side wall sections through said adhesive structural connections;

a bottom edge of each cove portion being attached by a respective adhesive structural connection to a top rail of the respective one of the side wall sections such that structural loads in the vehicle are communicated between the roof section and the side wall sections through the structural connections.

The floor is a 3-D structural shear plate. Along its longitudinal edges, this floor has horizontal metal rails into which the lower profiles of the molded side wall portions connect. The floor as an integral element may encompass the wheel housings, the rear podium or platform, and the like, it does not incorporate the side wall portions other than the extrusion along the edges, with these side wall portions being formed independently and connected to the floor along the rail or extrusion.

This provides that there are no metal frame members formed as part of the roof section and floor section which are connected to the side wall sections and the connections are formed by composite to metal joints. Thus the forces are transmitted through this composite to metal joint.

This provides that the roof section is primarily a fibreglass reinforced plastic and core structure attached to a floor structure of fibreglass reinforced plastic and core through the metal sidewall frame structure.

Thus the roof section is attached to the floor structure of fibreglass reinforced plastic and core at least partially through the metal side wall frame structure. Note that at either end of the aggregate composite body there are extruded profiles each in the form of an "H" on its side that cap the ends of the body. At the front, the "H" profile demarks the interface between the cab, which will likely be supplied by a bus manufacturer rather than the manufacturer of the panels, and the body and forms the rear post of the entrance door to the cab. The profile is bonded over the end of the body and is bolted to the adjacent window post over the front axle. When fully assembled, the cab is bonded into the leading edge of the "H" profile. At the rear, the rear cap of the engine module is bonded into the trailing edge of the "H" profile. These elements are important not only to establishing a rigid connection to the cab and rear cap assemblies, but also increasing the structural integrity and torsional resistance of the tube-shaped body, which would otherwise have none This provides that the structure is in effect defined wholly by the ladder like sections and the roof and floor sections with the roof and floor sections being channel shaped to form a beam. There may of course be rear and/or front door structures which are connected to the side wall sections.

Preferably the floor is substantially wholly connected across the vehicle from the side wall sections along its length so as to transfer loads therebetween with no transverse structural members except the "H" sections described above, which also extend across the floor at both the front and back.

Preferably there is provided a longitudinal stiffening member between each wall portion and a respective side edge of the floor.

Preferably each longitudinal stiffening member comprises a respective one of a pair of metal rails adhesively connected on one side to the floor and on another side to the wall portion.

Preferably there is provided at least one longitudinal stiffening member in the floor.

Preferably there is provided a window in each of the openings between the posts and wherein the top rail extends along the top of the windows and the bottom rail extends along the bottom of the windows and are spaced substantially by the height of the windows.

Preferably one side of the vehicle the side wall section includes at least one door opening as part of ladder structure including a top rail coincident with the top rail of the ladder structure and a bottom beam spaced downwardly from the bottom rail.

The rails along the edge of the floor connect to the vertical posts defining the door openings in the ladder structure by bolting. This is achieved as follows: the vertical posts which bracket the door opening are extruded rectangular profiles, with a C-shaped component on one of the narrow faces. This is similar to the "C" profile on the lintel and sill rails defining the window ladder and functions in the same manner. A cast aluminum gusset is fitted to the end of the floor rail, and this gusset intersects the door post at a right angle so that gusset seats over the "C" profile in the door post. A stainless steel, tapped plate is captured by the "C" channel in the door post.

Bolts pass through the "foot" of the gusset into the door post, connecting the two elements.

Preferably the ladder structure is formed from frame members which may be welded together to form the integral structure. This may be aluminum and, while welding aluminum is currently problematic, there are some new technologies on the horizon, such as stir welding, that do not compromise the integrity of the materials adjacent the weld line. Alternatively, the frame may be a stainless steel structure comprised of a series of formed sections welded together to form posts, lintels, sills, and floor rails. However the frame members may be bolted or coupled together using a rigid system to ensure that the ladder structure is able to transfer bending loads along the vehicle.

Preferably each of the roof, floor and wall sections are formed as resin infusions. However other manufacturing techniques may be used and one important aspect is the versatility of this hybrid structure is that it can be sold "by the foot".

Preferably the top edge of each wall portion of the floor section is attached to the respective one of the bottom rails of the side wall frame sections by an adhesive joint including a center web of the rail which is adhesively attached to an end edge of the wall portion and extends across the rail at an angle thereto different from 90 degrees and a flange on the wall portion which is adhesively attached to a side wall of the rail and a flange on the rail which is adhesively attached to a side wall of the wall portion with the flanges parallel and offset to respective sides of the rail.

Preferably the adhesive is arranged such that the adhesive releases its bond by heating to a release temperature which is less than the glass transition temperature of the resin and glass matrix which causes breakdown of the adhesive such that the roof section and/or the floor section can be separated from the metal rail. The arrangement of the adhesive is however only part of the de-mounting process. The joint cannot be entirely heated from the outside, therefore at least part of the adhesive bond line will be intact. The system may therefore use an imbedded copper wire mesh in the resin matrix immediately adjacent the joint bond line that is sufficiently resistant to the flow of electricity to produce heat. This acts to radiate into the joint and cause the breakdown of the adhesive as described above. This is particularly important when addressing the concerns of the greener elements of the European market.

Preferably each end cap is formed primarily from a metal and composite fabrication including metal frame elements for supporting the wheels. At least one of the end caps includes an engine for generating motive force and a transmission for communicating the motive force to the wheels. Each end cap includes an end wall defining a front or rear closure for the vehicle and frame elements extending from the end wall longitudinally of the vehicle. The frame elements include elements supporting the wheels including an inner end frame member extending transverse to the vehicle;

According to a second aspect of the invention there is provided a vehicle comprising:

a roof defined by at least one roof section;
a floor defined by at least one floor section;
and at least one rail;
at least one section of the roof sections and the floor sections being formed at least primarily from inner and outer fiber reinforced sheets containing a core material therebetween formed into an integral structure by a resin material therein;
wherein a first edge of said at least one section is attached to said at least one rail by an adhesive joint including a center web of the rail which is adhesively attached to an end edge of the section and extends across the rail and a flange on the section which is adhesively attached to a side wall of the rail and a flange on the rail which is adhesively attached to a side wall of the section with the flanges parallel and offset to respective sides of the rail and the center web of the rail being arranged at an angle to the flange of the rail at an angle greater than 90 degrees.

Preferably also a second edge of said at least one section opposite to said first edge is attached to a second rail by a second adhesive joint including a center web of the second rail which is adhesively attached to an end edge of the section and extends across the second rail and a flange on the section which is adhesively attached to a side wall of the second rail and a flange on the rail which is adhesively attached to a side wall of the section with the flanges parallel and offset to respective sides of the second rail and the center web of the second rail being arranged at an angle to the flange of the rail at an angle greater than 90 degrees.

According to a third aspect of the invention there is provided a vehicle comprising:

a roof defined by at least one roof section;
a floor defined by at least one floor section;
two side wall sections each defining a series of window openings in a row along the side wall section;
a front end section;
and a rear end section;
said at least one floor section defining a structural member which is generally channel shaped to define a generally horizontal floor portion and two generally upstanding wall portions, one on each side of the floor portion;
said floor portion being connected at each side edge thereof to a respective one of the wall portions by a respective rail extending longitudinally of said floor section with the floor portion and the wall portion being connected to the respective rail by an adhesive structural connection;
said floor portion and wall portions each being formed at least primarily from inner and outer fiber reinforced sheets containing a core material therebetween formed into an integral structure by a resin material therein;
wherein there is provided at least one longitudinal stiffening member along the floor portion;
the floor portion including as integral elements therewith wheel arches for covering ground wheels of the vehicle so that the wheel arches communicate loads into the floor portion by the integral connection therewith;
each wheel arch having an arched bottom surface facing the wheel, an arched upper surface facing into the vehicle, and an end wall having a bottom edge connected to a horizontal portion of the floor portion.

Preferably the wall portions each have an end face portion which is shaped to follow at least a part of the arched upper surface, the end face portion being connected to the arched upper surface.

Preferably the end face portion is bonded to the arched upper surface by an adhesive.

Preferably the vehicle includes a ground wheel, axle and suspension assembly mounted under the floor section at the wheel arches and wherein the assembly includes a pair of structural arch members into which loads from the ground wheel and axle are communicated and wherein the structural arch member is attached to the arched bottom surface to communicate loads thereto.

Preferably the structural arch member is bonded to the arched bottom surface by an adhesive.

According to a fourth aspect of the invention there is provided a vehicle comprising:

a roof defined by at least one roof section;

a floor defined by at least one floor section;

two side wall sections each defining a series of window openings in a row along the side wall section;

a front end section;

and a rear end section;

said at least one roof section comprising an integral structural member which is generally of inverted channel shape to define a generally horizontal roof portion and two depending cove portions, one on each side of the roof portion;

said at least one roof section being formed from inner and outer fiber reinforced sheets containing a core material therebetween formed into an integral structure by a resin material therein;

and two cove stiffening walls each having a bottom edge adhesively attached along the vehicle at a position adjacent a bottom edge of a respective one of the depending cove portions and having a top edge adhesively attached along the vehicle at a position adjacent a respective outer edge of the horizontal roof portion so as to define a channel between the cove stiffening wall and the respective cove portion.

Preferably each side wall section includes a metal top rail attached to the bottom edge of the respective cove portion and wherein the cove stiffening wall is attached along its bottom edge to a flange on the metal top rail.

Preferably the flange on the metal top rail extends inwardly of the side wall section.

Preferably the cove stiffening wall includes a receptacle channel therealong for receiving an advertising strip.

Preferably the cove stiffening wall has openings along a bottom edge thereof so as to allow escape of air from the channel so that the channel can act as an air conditioning transportation duct.

The present proposal provides an arrangement in which the vehicle is not wholly composite but is formed in an arrangement which includes composite shear planes at required locations together with metal or structural members which provide structural strength at the required locations. Thus the arrangement provides a hybrid body construction using lightweight metal components for the window area, where most of the stress is concentrated and composites where the inherent strength-to-weight ratio is most effective. The body is comprised of pultruded linear modules which form both the interior and exterior of the vehicle. These are the roof and coping, lower side wall and floor, spaced apart at the window line by a ladder structure, which may be welded aluminium tubes, to form the window structure and openings. The front and rear of the vehicle consist of universal end caps with the front containing the entrance door, operators work station, front axle and steering gear. The rear cap contains the power train, the rear axle and a fuel tank. These are hybrid structures with metal components conducting loads to the composite body. The front and rear caps can be adapted to any design, in both looks and motive power using various power systems available to suit the needs of the customer. The present, preferred design uses bolted connections between the metal members and bonded connections between the composite elements and the composite and metal elements. However this may be superseded as new fastening technologies emerge.

The pultruded concept used herein addresses length requirements by simply cutting the lineals to the required length, bonding the body tube together and attaching the standard end caps at each end. The huge tooling expense associated with the multiple mold strategy is avoided. Pultrusion technology provides the opportunity of incorporating a wide range of reinforcement to meet structural demands unique to longer vehicles while not carrying the penalty over into shorter more agile vehicles. Currently available exterior and interior finished can be applied directly to the surfaces of the pultruded structure to provide acceptable appearance.

The composite structure can be formed either by pultrusion or by resin infusion systems in which resin is infused into a structure comprising the core and external sheets. In other arrangements both pultrusion and resin forming techniques can be used to form a composite structure.

The front end can feature a simple welded aluminium assembly that carries the radius rods positioning the front axle, the suspension elements, the bumpers and extended at least partially under the body tube. While this could be aluminum, but it also could be stainless steel or even mild steel, depending on the preference of the OEM. The assembly will also include molded fiberglass components as well which contribute to the strength of the front and rear end caps, which also contribute to the torsional resistance of the "tube". Without the end caps, the tube does not have a lot of lateral stability and almost no resistance to torsion. The engine module at the rear is also formed as an aluminium structure that supports the drive train, the cooling system, the batteries, radius rods and drive axle, suspension and fuel tank. The rear axle may have a yolk at the forward end that extends under the body tube and is attached to the minimal chassis of the front clip of the body tube to overcome one of the chief obstacles to long term durability of composite bodies, that is creep.

In commercialization of the arrangement described herein, the end caps are independent of the body in the sense that they are completely self contained. Customers therefore can purchase the body structure including the pultrusions and resin structures either in knock down kit form or as a completely assembled body and build their own front and rear end caps.

BRIEF DESCRIPTION OF THE DRAWINGS

One embodiment of the invention will now be described in conjunction with the accompanying drawings in which:

FIG. 1 is a side elevational view of a vehicle according to the present invention.

FIG. 2 is a side elevational view similar to that of FIG. 1 partly broken away to show the structure of the metal components.

FIG. 3 is a cross sectional view along the lines 3-3 of FIG. 1.

In the drawings like characters of reference indicate corresponding parts in the different figures.

DETAILED DESCRIPTION

Figure 4:
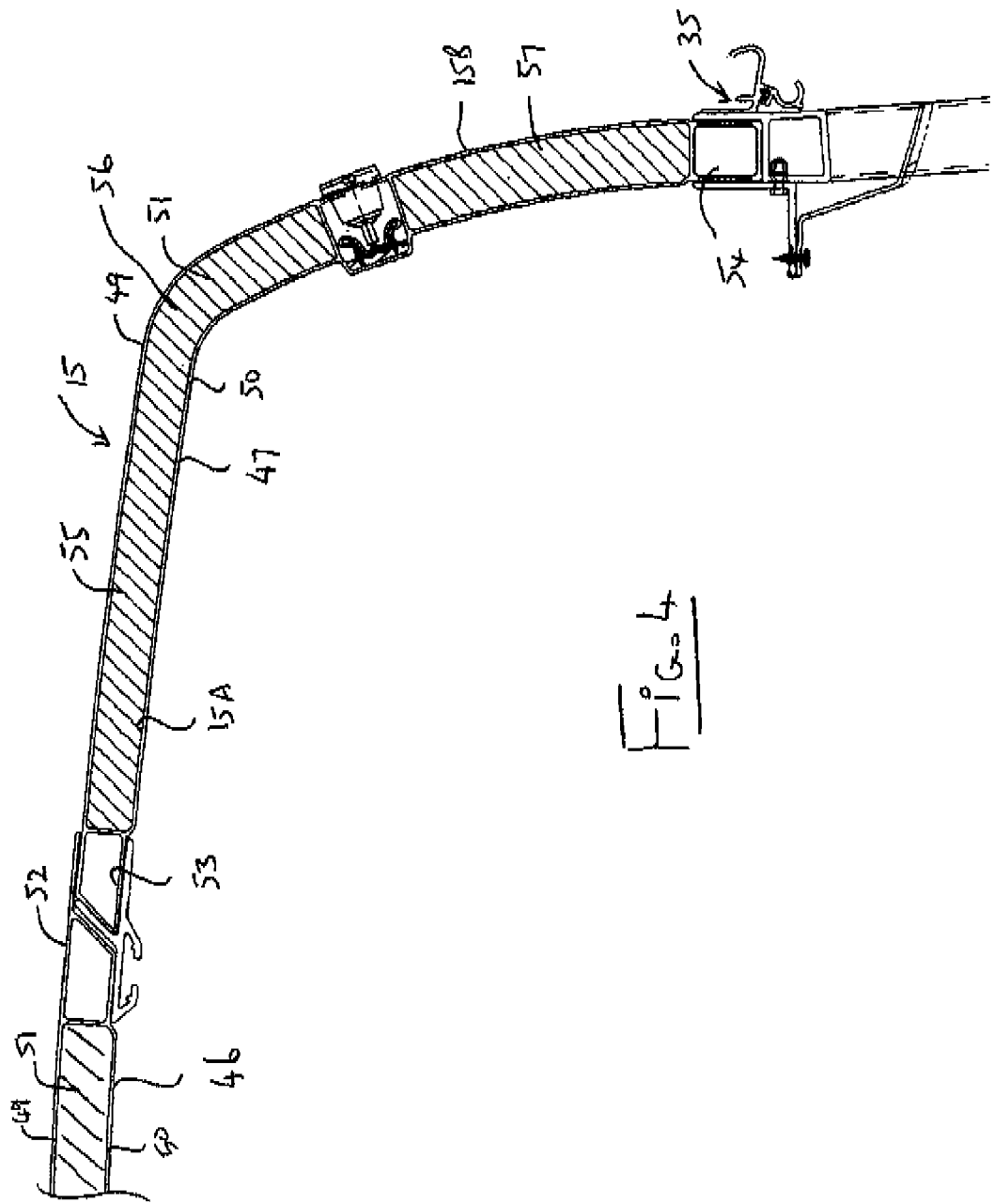
FIG. 4 is a part cross sectional view taken from that of FIG. 3 on an enlarged scale.

In FIGS. 1 and 2 is shown in side elevation the vehicle generally indicated at 10 which includes a rear end cap 11, a front end cap 12, a floor section 13, a side window frame section 14 and a roof section 15. The rear end cap 11 is fabricated primarily from metal to form a metal frame which extends forwardly to a forward end section 15 where the end cap connects to the floor section 13. The rear end cap 11 includes the rear axle and ground wheels generally indicated at 16 which are carried in a suitable suspension system attached to the metal frame of the end cap. The suspension system is not shown but includes links and suspension elements which hold the axle in place and support the axle relative to the vehicle for movement over the ground on the ground wheels. Rearwardly of the wheel assembly 16 is provided an engine or electric drive motor schematically indicated at 17 and a transmission 18 which are also carried in the metal frame of the rear end cap. An end section 19 of the end cap presents a rear end panel facing rearwardly of the vehicle. On the rear end panel is mounted the lighting systems generally indicated at 20 and also various access panels and the bumper as is well known. The rear end cap includes a floor panel 21 which is raised over the drive components and the axle so that passengers can enter the rear section and reside within the rear section in the end cap seated on suitable seating arrangements (not shown).

The front end cap includes an access entry 22 including doors 23 allowing passengers to enter on a floor section 24 within the front end cap. A front end panel 25 provides a vertical front section defining a front of the vehicle with suitable lighting systems 26 and the screen 27. A driver's console schematically indicated at 28 is provided within the end cap in front of the doors 23 and behind the screen 27 so that the driver can actuate the vehicle utilizing the various drive components carried in the console which communicate with the drive components in the rear end cap.

The rear end cap 11 terminates at a forward end frame section 29 defined by a vertical post 30 and a horizontal transverse top rail 31. Symmetrically the front end cap 12 terminates at its rear end at a frame section 32 defined by a post 33 and a horizontal rail 34.

The side section 14 as best shown in FIG. 2 is formed from a top horizontal rail 35, a bottom horizontal rail 36 and a plurality of vertical posts 37. In the example shown there is provided a doorway 38 which forms part of one of the side rails sections 14. Thus in the arrangement shown there is a rear vertical post 39, a front vertical post 40, the top rail 35, the bottom rail 36 and a second portion of the bottom rail indicated at 36A which is attached to the opposite side of the doorway 38 and extends rearwardly from the doorway 38 at a height slightly above the bottom rail 36. It will be appreciated that on the other side of the vehicle where there is no similar doorway 38, the rail 36 extends rearwardly to a post at which the rail 36A is attached and extends rearwardly therefrom. In an alternative arrangement the rail 36 may be a common rail extending the full length of the side section 14 parallel to and at a constant distance from the top rail 35.

The rail 35 and the rail 36 together with the vertical posts 39, 37 and 40 form a rigid integral structure formed from a suitable metal which is generally steel. Suitable connection of the posts to the rails can be provided by welding which provides a rigid structure resistant to bending loads. One objective is to reduce weight, so that the so-called ladder structure is optionally aluminum, with stainless or even mild steel being a less desirable alternative. The aluminum structure will be bolted; the ferrous structures will be welded. Gussets (not shown) are important to the rigidity of the ladder. In an all aluminum ladder with bolted connections, the gussets (at the top and bottom of each post) are hollow sand castings. The top gusset is T-shaped, the bottom is an inverted "T". In cross section, the vertical bar of the "T" is rectangular. The end of the vertical bar is shaped as a spigot, which fits into the top or bottom of the post and is bolted or riveted through the post. Thus the exposed surfaces of the post and the gusset are flush with each other. The cross bar of the "T" fits over the bottom or sill rail of the window, which is thus continuous, and bolts to it. The top surface of the window sill, and the bottom surface of the lintel, has a channel which captures a tapped stainless steel bolting plate so that the window posts can be arranged anywhere along the length of either.

The doorway 38 is formed by posts 38A and 38B together with a transverse beam 38C at the bottom so as to complete the rigid structure of the ladder structure forming the side frame 14. The posts of the frame and the rails of the frame can be connected by bolted or other couplings well known to a person skilled in the art provided the structure provides the necessary rigidity to accommodate bending loads along the vehicle.

The floor section 13 extends from a forward end 13A to an initial position 13B just in front of the ground wheels 16. Behind the end 13B is provided a further floor section 13C which is at a height higher than the floor section 13 to provide the raised section over the axle of the wheel assembly 16 and the transmission 18.

The front end cap 12 further includes a wheel assembly 16A which includes a suitable suspension and link system providing attachment of the wheel assembly to the front end cap together with the suitable steering linkages which steer the front wheels for guiding the vehicle.

The front end post 39 is attached to the post 29 of the end cap by a suitable connection so as to provide a rigid connection transferring loads from the side frame 14 to the rear end cap. A further post 39A stands upwardly from the end post 39 and attaches to the end post 29 with a transverse rail 39B connecting to the transverse rail 31 of the end cap. Symmetrically the front end post 40 of the side section 14 connects to the post 33 and a portion 40A thereof connects to the post 32 with a further horizontal rail 40B connecting to the horizontal rail 34 of the front end cap. In this way the structure defined by the side frame sections 14 and the front and end caps form a metal frame transferring loads therebetween. Apart from the doorway 38 the metal frame defined in the side sections extends only between the top rail 35 and the bottom rail 36.

The roof 15 includes a roof section 15A and depending coving wall 15B. The roof section extends from a rearward end 15C at the end wall 19 of the rear end cap to a forward end 15D at the end wall 25 of the front end cap 12. Thus the roof section is longer than the floor section since the floor section interconnects the floor portion of the end cap whereas the roof sections extends substantially along the full length of the vehicle.

Turning now to the cross section shown in FIG. 3, the roof section 15 includes the generally horizontal roof portion 15A together with two depending coving walls 15B on each side extending downwardly to the top rail 35 of the side frame sections 14. Thus the roof section forms generally a channel shape with the generally horizontal but slightly arched roof section 15A together with the depending coving walls 15B which provide structural strength to the channel.

Symmetrically the floor section 13 includes a horizontal floor portion 43 together with upstanding side wall portions 44 which extend from the floor portion 43 upwardly to the bottom rail 36 of the side frames 14. Thus again the integrally formed floor section 13 defined by the floor portion 43 and the side walls 44 forms a channel member which again provides structural shape due to the channel shape.

In general, therefore, the structural strength for the length of the vehicle is provided by the channel shape roof section 15, the channel-shaped floor section 13 and the metal side frames 14 which are formed in ladder shape thus holding the top rail 35 and the bottom rail 36 in fixed spaced position thus accommodating potential shearing loads extending horizontally between the top edge of the floor section and the bottom edge of the roof section.

The floor section 13 and the roof section 15 can be formed by pultruded elements or by resin infused sections or a combination of both. Thus the structure defines an inner skin or sheet defined by a fiber reinforced resin material, an outer sheet or skin again formed by a resin reinforced by fibers together with an intermediate core material. Such structures are of course well known and well known to provide suitable strength for vehicles of this type.

In the example shown, the floor section 43 is preferably formed as a resin infused system where the panels are defined by the upper and lower sheets indicated at 43A and 43B and a core 43C is defined therebetween. This structure can be manufactured so as to be self supporting without the necessity for the metal frame.

Preferably the remaining components from the structure are formed from pultruded panels where the raw materials are formed onto a core piece and pultruded in continuous manner through a pultrusion die so as to set the shape of the fiber reinforced resin sheets on the inside and outside surfaces of the core. Alternatively the core may be formed by filling a hollow pultrusion after it is formed. Alternately pultruded sheets can be bonded over a moulded core, encapsulating it.

Turning now to FIG. 4, the structure of the roof section 15 is made more clear extending from the rail 35 through the coving wall 15B and into the roof portion 15A. This structure is formed in three pieces including a central panel 46, a first side panel 47 and a third side panel 48 which is not visible in FIG. 4 but is symmetrical to the side panel 47. In the embodiment shown all of these panels are formed from a pultrusion process to define an outer sheet 49 and an inner sheet 50 filled between the sheets with a core 51. The central panel 46 is slightly arched shape and extends from an edge piece 52 across a central section of the roof to an opposed end piece 52 symmetrical to the piece 52 visible in FIG. 4. The panel 47 extends from an end piece 53 at the roof to an end piece 54 which attaches to the rail 35. The panel 47 includes an inner piece 55 which follows the curvature of the panel 46 outwardly to a corner 56 where the panel curves sharply downwardly to a section 57, which may or may not be arched, depending on the design of the bus side wall, which extends downwardly to the edge piece 54.

Figure 5:
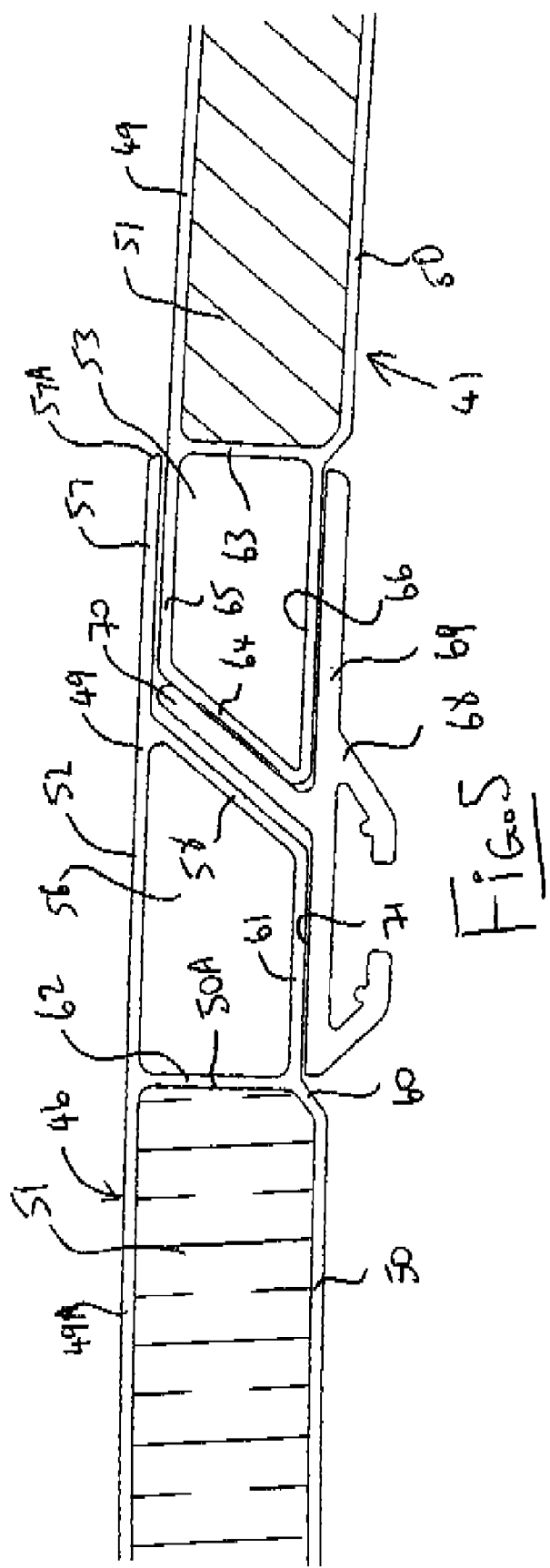
FIG. 5 is a part cross sectional view taken from that of FIG. 3 on a further enlarged scale showing a connection in the roof.

Turning now to FIG. 5, the structure of the end pieces 52 and 53 and their connection is shown in more detail. Thus the end piece 52 includes a top wall 49A which continues from the end of the core as indicated at 50A through a section 56 which may or may not be hollow to a flange piece 57 which projects beyond an end wall 58 of the hollow. The bottom wall 50 is recessed at 60 to define a bottom wall piece 61 parallel to the top wall piece 52 and defining a bottom of the section 56. Thus the section is defined by a transverse wall 62 closing off the end of the core 51, the top wall 52, the bottom wall 61 and the inclined end wall 58.

The end portion 53 of the coving panel is defined by a transverse wall 63, an inclined end wall 64 and a top wall 65 and a slightly recessed bottom wall 66 all symmetrical to the end of the panel 46 with the exception that the panel 46 includes the projecting flange portion 57. These elements are connected by a metal connecting member 68 which has a bottom wall 69 and a flange 70 extending upwardly and outwardly therefrom at an angle to lie between the end walls 58 and 64.

It will be appreciated that the panels extend along the full length of the roof section and also the connecting member 68 also extends along the full length to form an integral structure defined solely by the composite panels 46 and 47, the symmetrical left hand composite panel 48 and the two connecting members 68 and the symmetrically opposite one on the left hand side of the vehicle which is not shown in FIG. 4 or 5. The connector 68 is formed from a suitable metal which is preferably either aluminium or steel which provides the connection between the panels. It will be appreciated that the formation of a single structure to span the full width may be difficult without the provision of complicated molds since pultrusion machines generally are insufficient width to manufacture a product of this size. Thus the rails or connecting members 68 provide the necessary connection. The connection is provided by an upper surface 71 of the connecting member which is adhesively fastened to the bottom surface of the wall 61 of the panel 46 and to the wall 66 of the panel 47. The flange 70 is symmetrically adhesively fastened to the outside surface of the inclined wall 58 and to the outside surface of the inclined wall 64. Thus the connecting member is adhesively fastened to both elements and loads are transferred between these elements by the plate 69 of the connecting member and also the flange 70. The flange portion 57 which forms an extension of the top sheet 52 to an outside edge 57A extends over the top surface of the wall 65 of the end portion of the panel 47 and is fastened thereto also by adhesive. This flange thus forms a water shedding flange so that water from the roof is carried from the edge 57A and can be discarded to the top surface of the panel 47 to run over the panel 47 to the drip channel attached to the top rail 35. The portions 52 and 53 of the panels can be hollow since they are reinforced by the presence of the connecting member 68 so that it is not essential to provide a core 51 at this location.

A one-piece, resin-infused roof (not shown) may be superior to a sectional roof as depicted in FIG. 5 and may be used.

Figure 6:
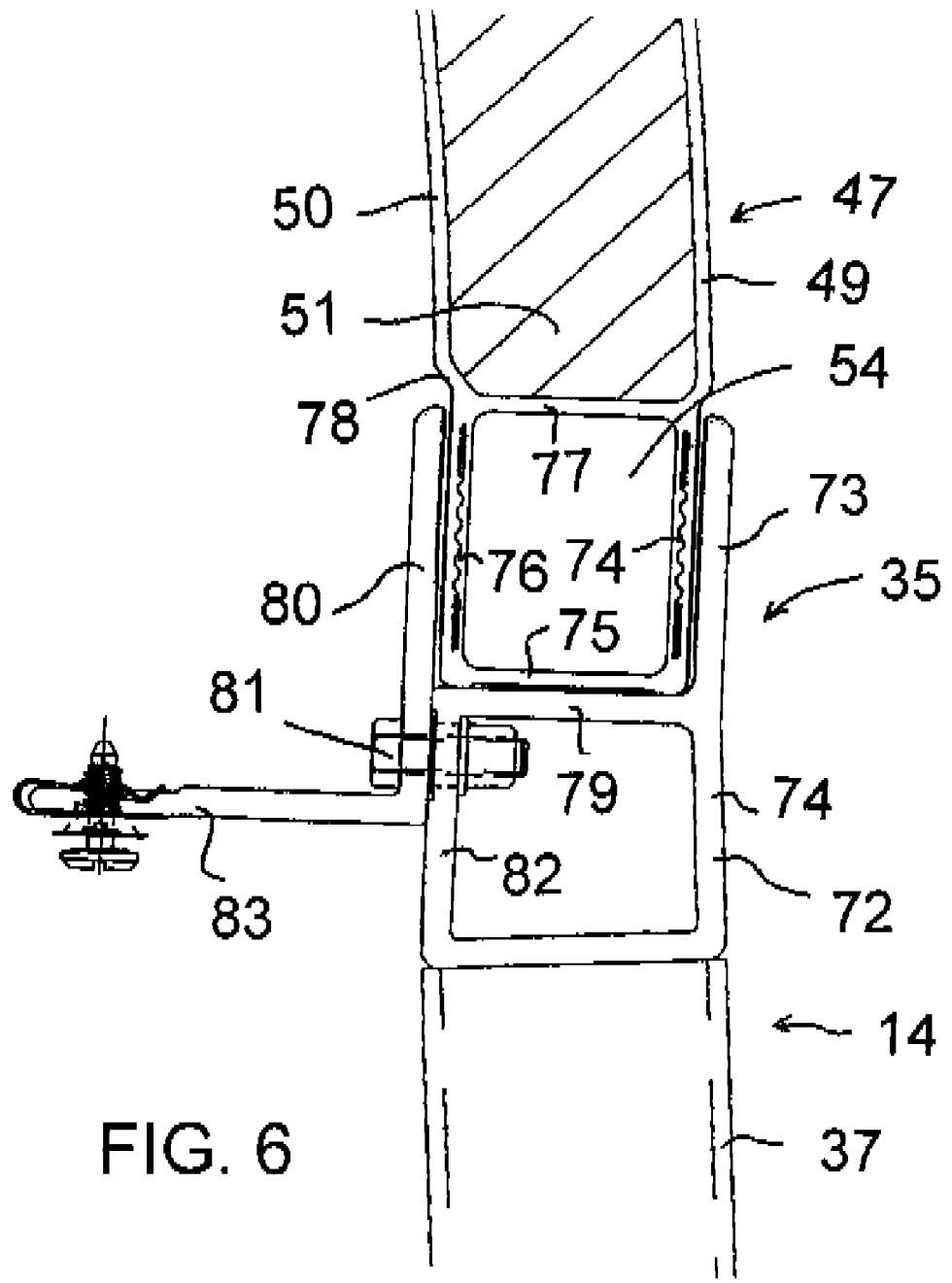
FIG. 6 is a part cross sectional view taken from that of FIG. 3 on an enlarged scale showing a connection between the roof coving and the top rail of the window frame.

Turning now to FIG. 6, there is shown the connection of the end portion 54 of the panel 47 to the top rail 35 of the side frame section. Note that in this illustration, the drip rail has been omitted. Thus the top rail 35 includes a hollow tubular portion 72, where there is no core contemplated or required in the hollow sections, which is attached to the posts 37 of the side frame section 14. The hollow tubular portion 72 provides primarily the structural strength of the top rail 35. In addition the top rail 35 includes an upstanding flange 73 which is an extension of the side wall 74 of the tubular portion at the outside surface of the vehicle. The flange 73 thus stands upwardly along the outside and receives the outside portion 74 of the outside skin 49 of the panel 47. The portion 54 thus includes the outside wall 74, an end wall 75, an inside wall 76 and a transverse connecting wall 77 at the end of the core 51. Similarly the inside wall 76 is slightly recessed as at 78 from the inside skin 50. The end wall 75 and the outside wall 74 of the portion 54 are adhesively attached respectively to the top wall 79 of the tubular portion of the rail 35 and to the flange 73 by adhesive. The inside wall 76 is held in place by an additional flange element 80 which extends parallel to the wall 73 and is held at a fixed position spaced from that wall so as to receive the end of the panel 47. However, rather than the flange portion 80 being formed integrally with the upper rail 35, it is instead formed as a separate piece which extends to the tubular hollow portion 74 and is attached thereto by bolts 81 which extend through a lower part of the flange 80 and into a wall 82 of the hollow tubular portion 72. At the bottom of the flange portion 80 is provided an integrally formed inwardly extending flange 83 which forms a structural member for the interior of the vehicle to which suitable internal components of the vehicle can be attached as is well known to one skilled in the art. The inside surface of the flange 80 is adhesively attached to the outside surface of the wall 76. In this way the end portion 54 of the panel 47 is held in fixed position in what is in effect a fabricated channel at the rail 35 thus transferring forces therebetween.

The only structural connection between the roof section and the rail 35 is provided at the junction between the edge portion 54 and the rail itself. There are no metal elements which transfer loads from the metal top rail 35 into the roof section. The roof section itself is thus primarily a composite element and the loads between these two elements are provided only at the edge piece without a frame at the inside of the roof section or other metal elements which provide connection of loads into the roof section except at either end of the body "tube".

Turning now to the floor section which includes the floor panel 43 and the upstanding side wall portions 44, it will be noted from FIG. 3 that the floor panel is formed in three sections including a center section 84, two side sections 85 and the upstanding side walls 44. There is a connection member 86 at the side edges of the center panel 84 which connect to the side panels 85. Similarly there is a connection portion 87 which is located at the junction between the floor panel and the upstanding side walls 44. At the top edge of each side wall 44 is provided a connecting portion 88 which connects to the bottom rail 36.

Figure 7:
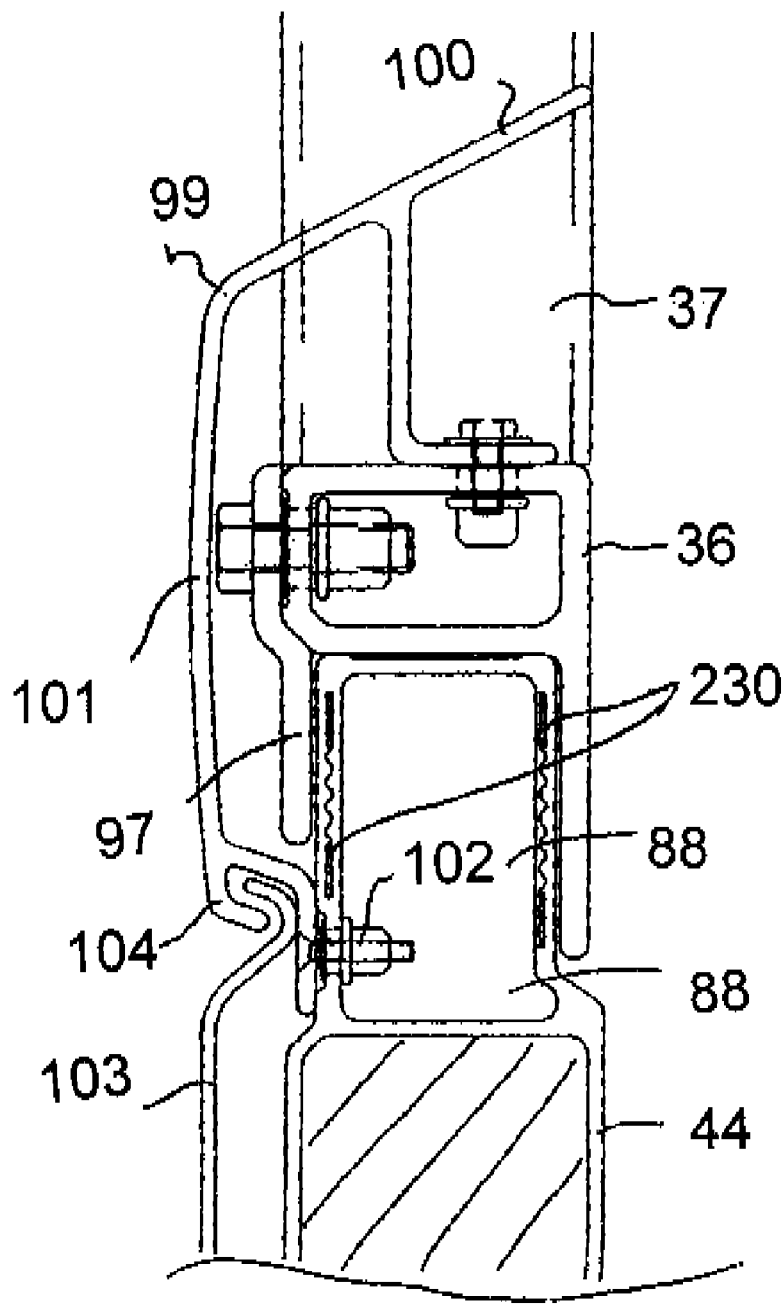
FIG. 7 is a part cross sectional view taken from that of FIG. 3 on an enlarged scale showing a connection between the roof coving and the top rail or lintel of the window frame, showing a connection between the wall section of the floor and the bottom rail or sill of the window frame.
Figure 8:
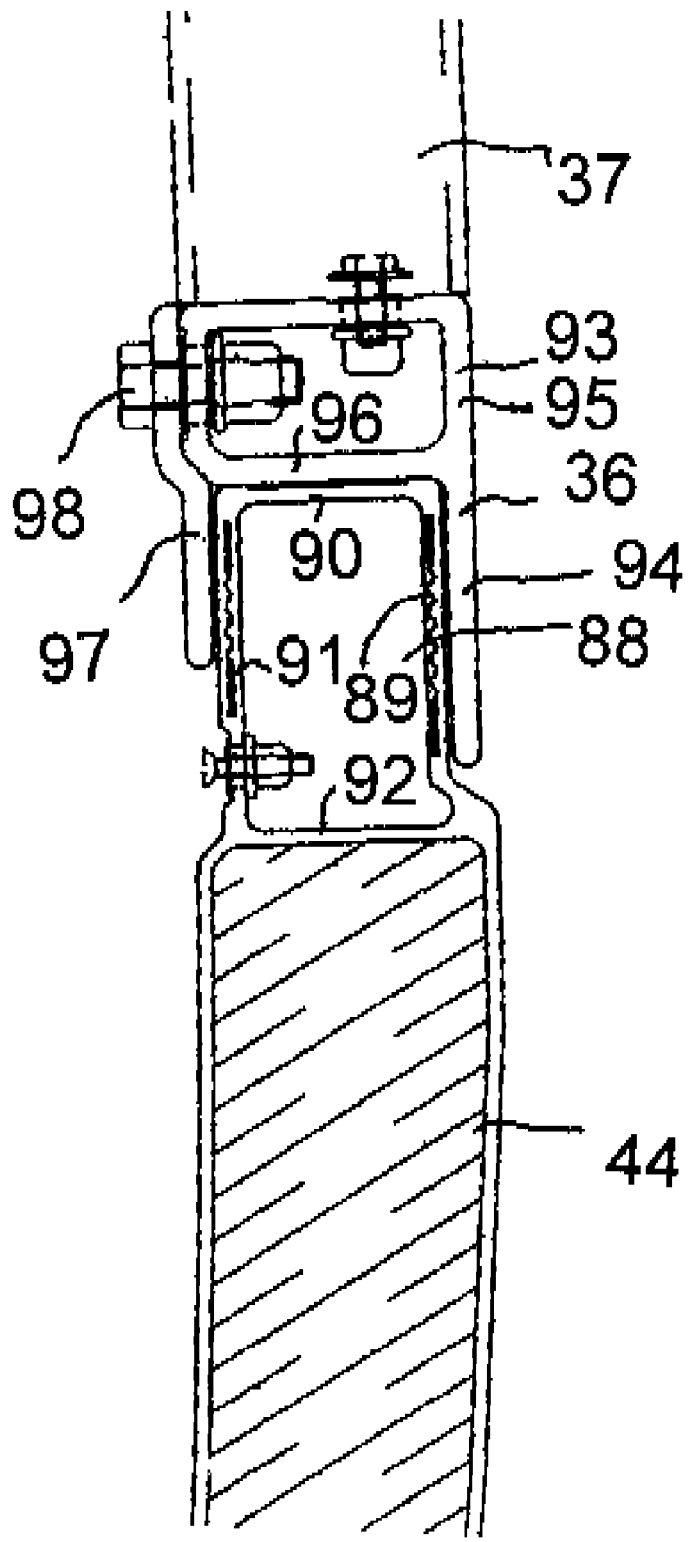
FIG. 8 is a part cross sectional view taken from that of FIG. 3 on an enlarged scale showing a connection between the roof coving and the top rail of the window frame, with a section of the interior cladding removed.

Turning now to FIGS. 7 and 8, the connection between the portion 88 and the bottom rail 36 is shown in more detail. Thus as best shown in FIG. 8, the portion 88 at the top of the wall 44 is again a hollow section defined by an outside wall 89, an end wall 90, an inside wall 91 and a transverse connecting wall 92. The bottom rail 36, symmetrically to the top rail 35 includes a hollow tubular portion 93 with a depending flange 94 at the outside wall 95 of the tubular portion 93. The end portion 88 of the wall 44 is adhesively attached to the channel rail 36 by adhesive between the outside wall 89 and the flange 94 and by adhesive between the end wall 90 and transverse wall 96 of the tubular portion 93.

Again symmetrically relative to the top rail 35, there is provided a flange piece 97 which is attached by bolts 98 to the tubular portion 93 and that flange piece extends downwardly on the inside wall 91 of the end wall 88 and is adhesively attached thereto. Attached to the tubular portion 93 is the bottom end of the vertical posts 37. Thus it will be noted that the top rails 35 and the bottom rail 36 together with the post 37 define rectangular openings for window sections to be inserted therein. The window sections of course provide further structural strength since the glass is contained within these rectangular openings and thus forms also a structural member.

Bonded windows, which are at present not allowed in North America, but are slowly coming into acceptance as European vehicle manufacturers make in-roads into the NA market. To get around the service and replacement problems inherent in bonded windows, the windows (known as lites in the trade) can be bonded to an aluminum frame, which is mechanically connected to the window posts. If the window is damaged and requires replacement, the frame can be removed and a replacement frame, complete with lite, can be inserted. The damaged window is sent back to the shop, the damaged lite is cut out and replaced, and the window put back into maintenance stock awaiting the next incident. In the present arrangement, a new window structure can act as a shear plane, without the service hassle of removing multiple fasteners to replace the window. Only certain windows are mechanically connected to the window jambs in such a way as to carry shear loads. These are located over the front ground wheels, the rear deck (behind the passenger exit door), and immediately forward of the passenger exit. The balance of the windows will be emergency exit type, as required by law and therefore not capable of carrying any load.

As shown in FIG. 7, this window opening is supplemented by a window sill member 99 which includes an upwardly and outwardly inclined portion 100 extending through the opening defined by the bottom rail 36 and the posts 37 to cover the lower sill of the window frame assembly, which includes in some cases a latching mechanism, as a decorative finish and also to prevent passenger contact with the latching mechanism. Surface 100 is angled to discourage graffiti and also make it difficult rest one's elbow or stand on the sill. A depending cover portion 101 extends from the sill downwardly to a position beneath the flange 97 and is fastened to the end portion 88 of the wall 44 by screw fastener 102. Thus the sill portion covers the inside surface of the bottom rail 36 to provide an attractive appearance. A further decorative panel 103 is fastened to the bottom of the depending portion 101 at a connecting joint 104. The decorative panel 103 rotates to an angle of 105 degrees, at which point it can be removed for service.

Figure 10:
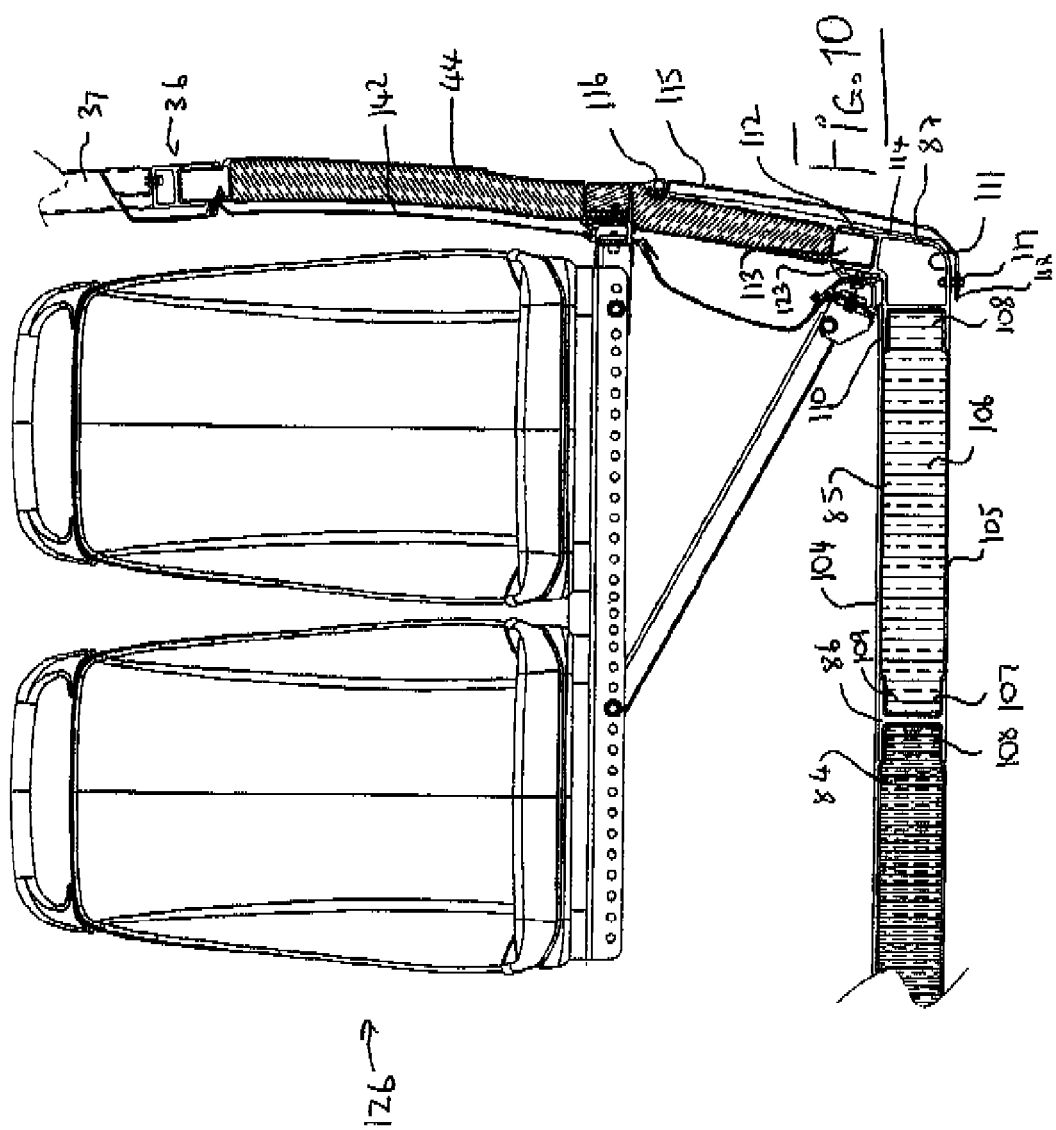
FIG. 10 is a part cross sectional view taken from that of FIG. 3 and including the mounting of seats to the floor section and the coupling of the wall portion to the window frame.

Turning now to FIG. 10 the panels 84 and 85 are formed by resin infusion from the inner sheet 104 and the outer sheet 105 with a honeycomb or balsa core 106 therebetween. The core extends into end pieces 107 and 108 which are fastened to the connecting members 86 and 87. Thus the connecting member 86 forms a H-shaped channel member defining two horizontally facing receiving channels 108 and 109 each for receiving an edge piece of the respective panel 84, 85. Thus each panel has a portion at the end which is slightly reduced in thickness by shaping of the core so that the piece is received within the channel 108 109 and is adhesively attached thereto. Symmetrically the end piece 108 of the panel 85 is inserted into a similar channel 110 of the connecting member 87.

Thus the floor is formed from the separate sections of the resin infused panels which are connected edge to edge within the channels of the connecting members. There is no frame extending across the floor there is no frame extending longitudinally of the floor. The floor is formed primarily from the panels themselves. It is possible that the whole with the floor can be formed as a single panel without the necessity for the connecting pieces 86 if the equipment is available to manufacture a floor of the required width. However more simply the floor can be formed in separate panels which are connected for edge to edge for simplicity of construction. The floor can be formed alternately as a resin infusion, in one piece, as per FIG. 17, in which case the element 86 disappears, replaced by pultruded square tubes embedded in the resin infused sandwich, A resin infused uni-floor is more advantageous than a pultruded floor and cheaper too.

The connecting member 87 comprises a hollow tubular center portion 111 together with the channel 110 facing horizontally receiving the floor and a channel 112 for receiving the bottom edge 113 of the panel 44. The hollow tubular portion is shaped to support the channels 110 and 112 at the required angle so that the floor panels are horizontal and so that the bottom edge portion of the side wall panel 44 is inclined upwardly and slightly outwardly from the connecting member 87.

It will be noted therefore that the channel or connecting member 87 is recessed slightly inwardly from a vertical line depending downwardly from the bottom rail 36. Thus the connecting member 87 and its outside wall 114 is spaced inwardly from what is in effect the side of the vehicle by a distance of a few inches thus recessing this area out of contact with elements which would impact the side of the vehicle. A covering panel 115 is provided which is fastened to the outside surface of the side wall panel 44 at a coupling 116 so that the panel 115 extends downwardly to provide a protective and aesthetic covering for the bottom portion panel 44. The decorative panel 115 is fastened underneath the coupling member 87 at a bolt 117 which fastens a horizontal portion 118 of the flange to the underside of the connecting member 87.

Figure 9:
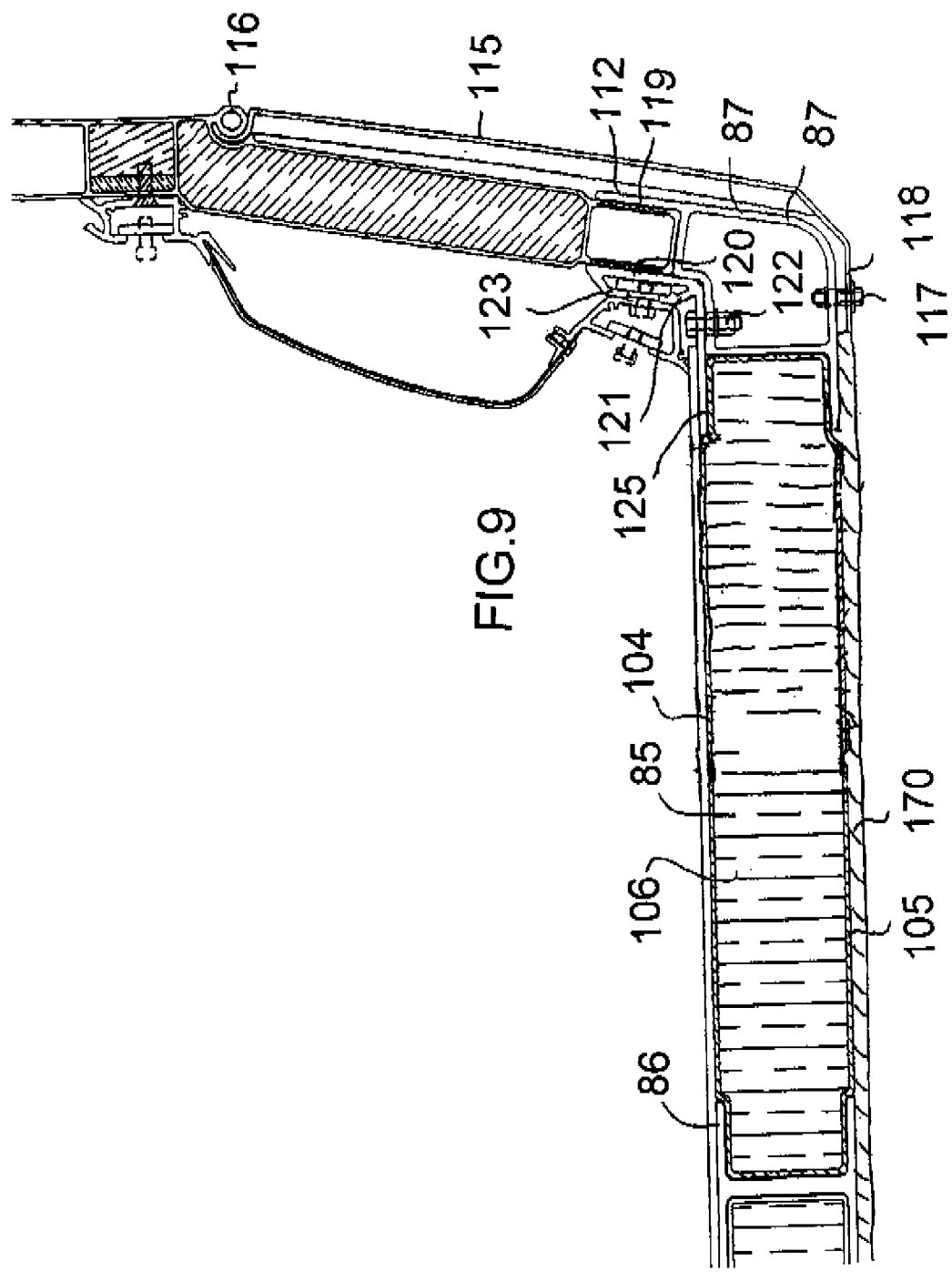
FIG. 9 is a part cross sectional view taken from that of FIG. 3 on an enlarged scale showing primarily the floor section including a connection between the wall portion and the floor portion of the floor section and the coupling of the seat support rail to the wall portion below the window frame. The window frame assembly and connection is not shown in this figure.

As best shown in FIG. 9, the connecting member 87 defines the channel 112 to include an outer wall 119 and an inner wall 120. The inner wall 120 forms part of a fastening piece 121 which is separate from the connecting member 87 and is fastened thereto by bolts 122 extending into the tubular hollow portion of the connecting member 87. Thus the portion 121 includes the wall 120 and a channel 123 forming a fastening element on the inside face of the wall 120. Further the member 121 forms a horizontal flange 125 which fastens over the top wall of the end portion 108 of the panel 85.

Figure 17:
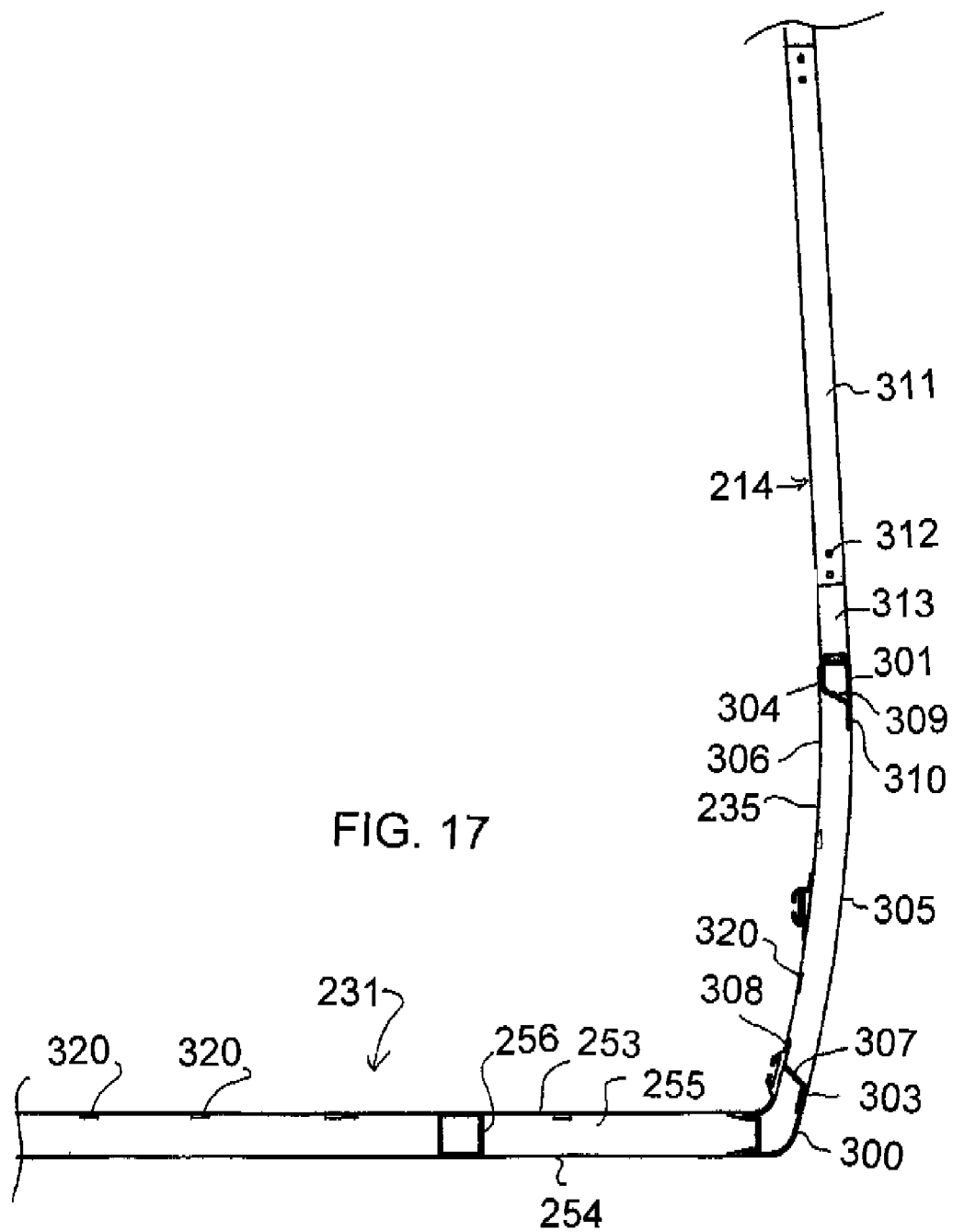
FIG. 17 is a transverse cross sectional view of the side section and floor section of the embodiment of FIG. 13.

Thus in FIG. 10 it will be noted that the connecting member 87 is an integral structure forming both the channels and forming the mounting rail 123 whereas in FIG. 9 the structure is manufactured from separate pieces. The manufacture of the structure of separate pieces allows the mounting of the end of the panel into the channel by firstly placing it against the end wall and the side flange at the outer side and then by bolting the extra piece 121 into place so as to clamp the end portion of the panel in place within its channel. This arrangement therefore makes assembly more simple and allows a smaller tolerance outside the end portion of the panel since it can be placed into the channel and the channel closed around it rather than requiring it to be slid into the channel. With respect to rails 35, 36, and 87 that are assembled using separate pieces, there are a number of reasons for this. Firstly there is an electrical resistance mesh in the composite material immediately adjacent the joint. This is an electrical resistance mesh, which can be energized to create thermal energy, which is conducted towards the aluminum (being a heat sink) through the adhesive, causing it to reach its glass transition temperature and separate. This facilitates disassembly which is a critical selling point in the EU where the "Greens" have legislation in place that effectively bans bonded composite vehicle structures because they cannot be easily disassembled for recycling or disposal. Secondly the U-shaped channel is not adhesive friendly as it is difficult to apply the adhesive in the channel and when inserting the end of the panel 44 into the channel, the adhesive is wiped off the side walls of the channel and pushed to the bottom, creating a weak joint. As can be seen in FIG. 17, the joints do not feature a "U" channel, and are more friendly to both adhesive and production procedures. Thirdly the tolerance angle is a good one.

Thus the side wall portion 44 extends from the bottom rail 36 to the coupling 87. Thus the floor section defined by the floor panel and the upstanding side wall portions 44 is primarily formed from a composite material with the only structural members being formed by the longitudinal coupling elements 86 and 87 which extend along the length of the floor panels.

Thus there is no frame which supports the floor and there is no frame which couples the floor section to the side rails 36. The only connection from the floor section to the side rail 36 is provided by the coupling of the edge piece of the wall portion 44 which extends into the channel of the side rail 36. There is no metallic connection and no metal elements which provide reinforcement or support for the floor section relative to the side rail 36.

Figure 11:
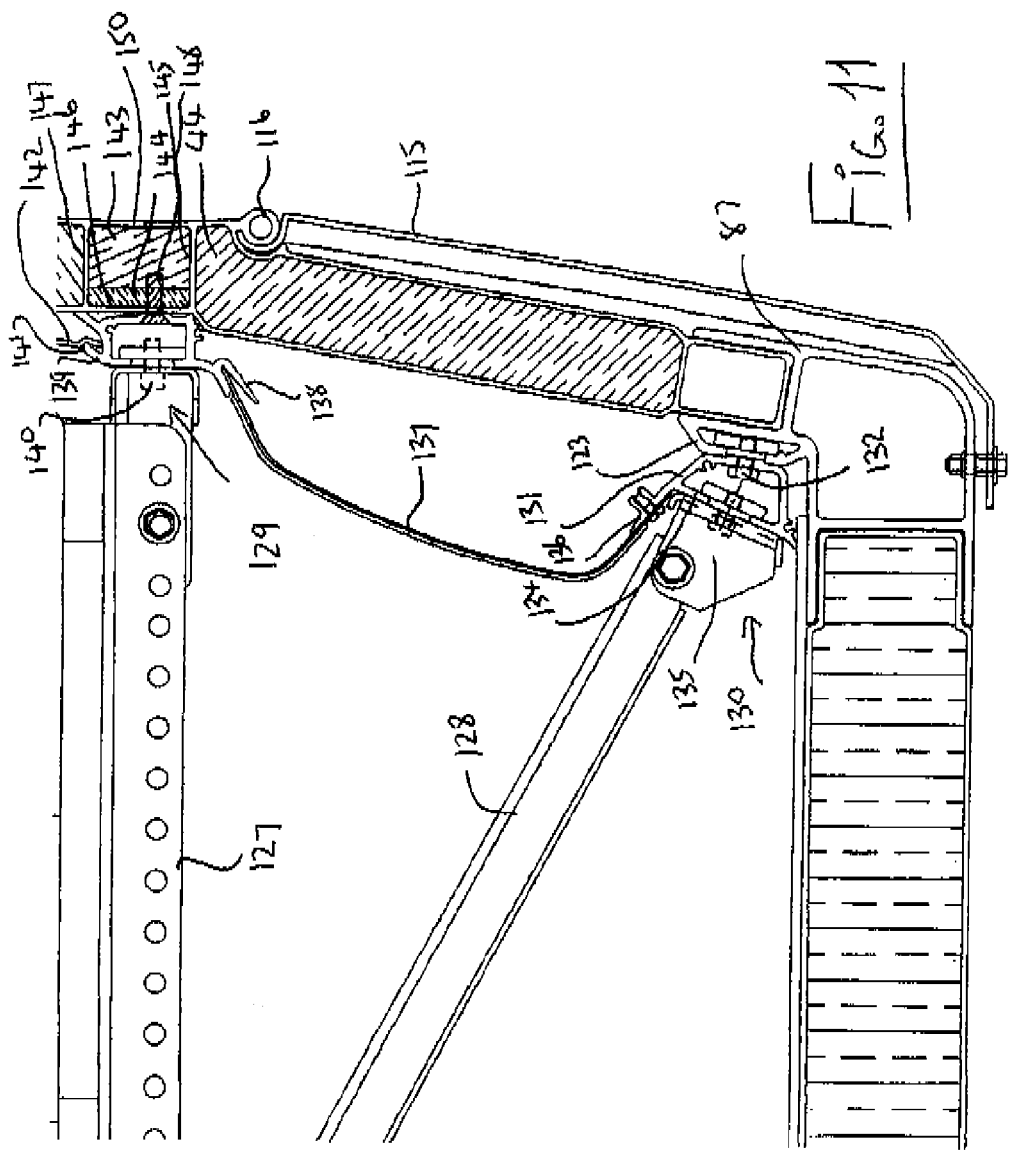
FIG. 11 is a cross section similar to that of FIG. 10 on an enlarged scale.

Turning now to FIGS. 10 and 11, there is shown the support structure for a seat generally indicated at 126. The seat support comprises a horizontal rail 127 and an inclined brace 128. The seat structure is cantilevered from the side wall portion of the floor section and particularly between the side wall panel 44 and the coupling member 87. The seat structure supported by the horizontal member 127 and the brace 128 thus applies loading from the horizontal member 127 at a support bracket generally indicated at 129 which generates compression forces downwardly relative to the wall panel 44 and tensile forces horizontally away from the wall panel. The brace 128 applies compression loading downwardly onto the rail 123 through a bracket generally indicated at 130 where compression loading is vertically downwardly at the bracket 130 and also horizontally toward the wall panel 44 and the coupling member 87. The bracket 130 comprises a bottom bracket portion 131 which fastens to the rail 123 by threaded fasteners 132. The bracket 131 provides a flange 134 which attaches to a lower end portion 135 of the brace 128. The bracket portion 131 provides a support flange 136 for a closure wall 137 which extends from the flange 136 upwardly along the inside surface of the wall panel 44 to a flange coupling 138 at the bracket 129 of the rail 127. The wall 137 defines with the inside surface of the panel 144 a hollow area for receipt of vehicle component such as heating or cooling systems. The bracket 129 includes a rail 139 which extends along the side of the vehicle along the inside of the panel 44 at the height of the rail 127 of the seat. The bracket 129 fastens by screws 140 to the rail 139. The rail 139 defines the flange 138 and also a receptacle 141 at the top for another covering panel 142. Panel 142 is the lower end of panel 103 in FIG. 7. The rail 139 is fastened to the panel 44 at a fastening portion 143 of the panel 44. The fastening portion 143 is integrally formed with the panel 44 during manufacture and includes a mounting plate 144 which receives screws 145 from the rail 139. The mounting plate 144 is formed within the panel during the manufacturing process. The plate 144 butts against the inside sheet 146 of the panel 44 at the mounting arrangement 143. Side walls 147 and 145 extend through the thickness of the panel 44 and thus connect from the inside wall 146 of the panel 44 to the outside wall 150. These walls 145 and 147 contain fibers which are wrapped around the plate 144 and bridge between the inside sheet 146 and the outside sheet 150 so as to transfer loads between the inside sheet 146 and the outside sheet 150 and transfer those loads from the plate 144 to the outside sheet 150. In this way the plate 144 is prevented from being pulled away from the structure and de-laminating the panel by the wrapped fibers which extend around the plate, through the wall 148, along the outside sheet 150 and back through the wall 147. These fibers prevent the delamination and transfer the loads from the rail 127 of the chair into the whole of the wall panel 44.

The compression loads at the bottom of the brace are transferred into the floor section at the coupling member 87 so that those loads are transferred both into the floor panels and the side wall panel 44. Horizontal, tensile forces extending outwardly of the floor section applied to the floor section by the braces 128 at spaced positions along the length of the floor section are accommodated in the floor section by the floor section pulling inwardly at the coupling members 87 on each side of the vehicle.

As an alternative to the plate 144 and the wrapped fibers at the walls 147 and 148, it is possible to replace this structure by an insert member which is attached on the inside surface of the panel 44 and is bonded to the inside surface of the inner sheet 146 and to the inside surface of the outside sheet 150. Such a structure can be preformed for example as a H-shaped member which thus provides a plate at the inside surface for receiving the screws 144 and a plate at the outer surface for transferring the loads through a flange between those plates from the inside surface to the outside surface.

Figure 12:
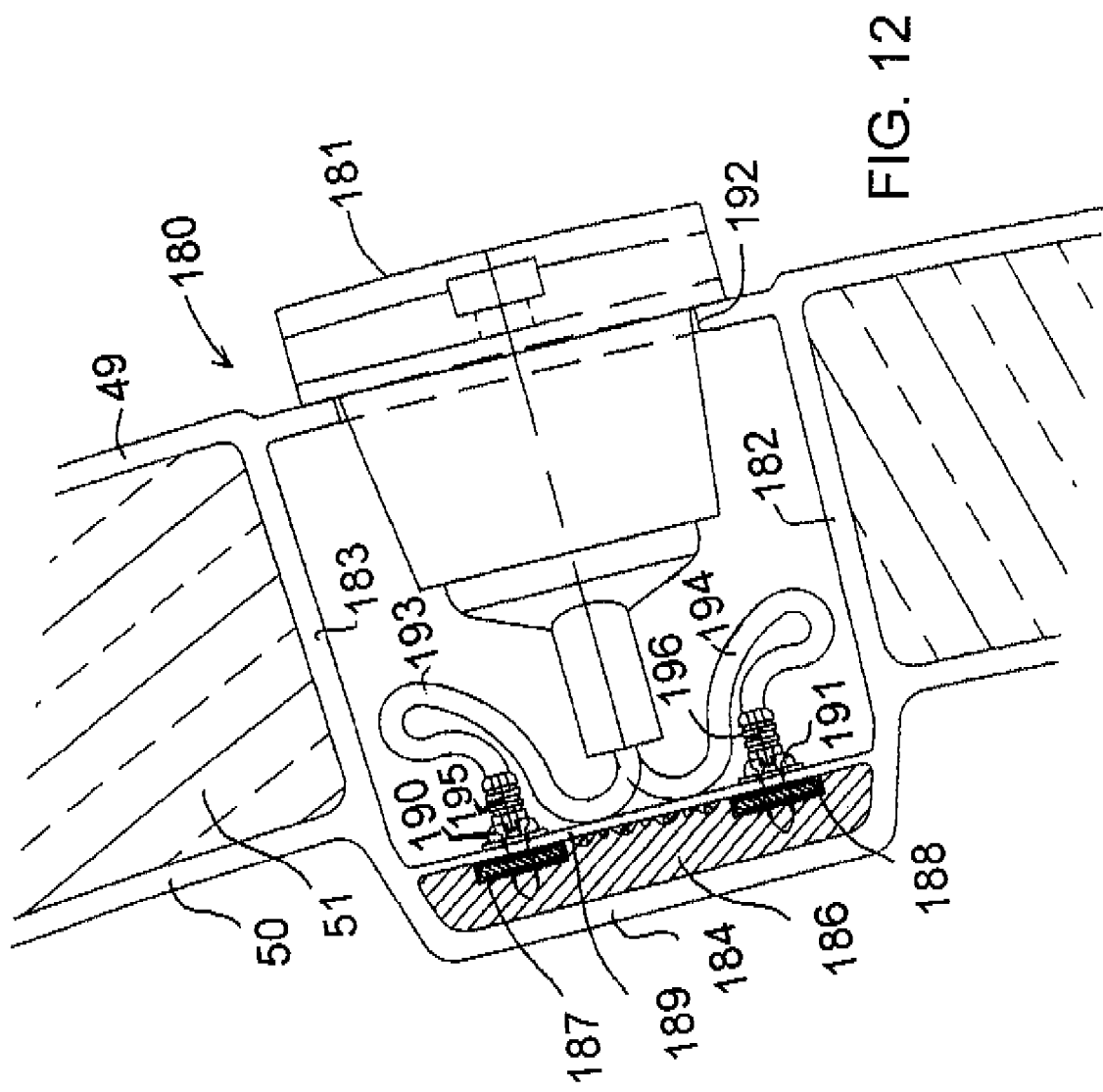
FIG. 12 is a part cross sectional view taken from that of FIG. 3 showing the mounting of lighting within a lighting track or chase.

Turning now to FIGS. 3 and 12 there is shown in coving section 15B of the roof section 15 a channel 180 which is provided for supporting lighting fixtures 181. This channel 180 is formed as an integral structure with the panel and includes side walls 182 and 183 together with a base wall 184 which is recessed inwardly from the inside wall 50 of the panel structure. The receptacle 180 is hollow and thus free from the core material 51. At the inside wall 84 of the receptacle is provided a base sheet 186 within which is embedded a pair of conductors 187 and 188 which extend along the full length of the channel 180. Thus these elements are formed in the initial formation of the pultruded structure so that the sheet 186 together with the conductors are laid into the structure and pultruded with the structure. A covering wall 189 encloses the embedded conductors 187 and 188. Thus these conductors are contained within the structure but are accessible by penetrating screws 190 and 191 which can be penetrated into the structure through the wall 189 and into the respective conductors as required along the length of the receptacle. In this way each light fitting 181 of the vehicle on the exterior wall is located through a hole 192 formed in the outside wall 49 so that the light fitting can be inserted into the hollow interior of the receptacle 180 and leads 193 and 194 from the light fitting connected by electrical connectors 195 and 196 to the screws 190 and 191 respectively which penetrate into the conductors for receiving a voltage thereacross. In this way each light fitting 181 is tapped into the conductors and can be located at a required position along the length of the vehicle. These light fittings thus provide exterior lighting such as indicator lighting and peripheral lighting for the vehicle.

Also shown in FIG. 9 is a coating layer 210 of an intumescent paint material. The coating 210 is applied over the whole of the bottom surface of the floor section 13 and the coupling rail 87. Intumescent coatings of this type are known and have the characteristics that they expand on application of heat thereto. The coating thus expands in the event of a fire or other application of heat to the floor so as to provide a thick insulating layer thus reducing the possibility of heat penetration.

In addition with the floor formed wholly from the composite material defined by the inner sheet 104 and the outer sheet 105 with the core material 106 therebetween. The floor is free from frame members which can be damaged on heat. Thus manufacturing such a floor without frame support and with the intumescent coating allows the floor to accommodate extended application of heat such as in a fire to allow passengers to escape without the floor becoming damaged, sagging or breaking during the heat application. This arrangement may therefore allow the structure to satisfy the desirable standard to meet to prevent fire damage to passengers.

Turning again to FIG. 7, the structure connecting the edges of the panels to the metal rails of the sidewalls is provided by an adhesive connection of the edge piece of the panel into a channel of the respective side rail. In the embodiment shown there is added heating elements indicated at 230 which are embedded in the edges of the panel during manufacture. These heating elements can be used to disassemble the structure of the vehicle when required. The disassembly is effected by application of heating current to the heating elements 230 within the end walls of the panel. These heating elements act to melt or soften the thermoplastic adhesive commonly used to attach the end of the panel into its receiving channel. When the adhesive is sufficiently softened, the flange 97 can be removed by unbolting allowing the remainder of the edge of the panel to be pulled away from its adjacent surfaces. In this way the metal components can be separated from the composite components for purposes of repair or for purposes of disassembly when the vehicle is no longer required. Other heating arrangements can be provided which allow the adhesive to be heated sufficiently to release its adhesive effect.

Figure 13:
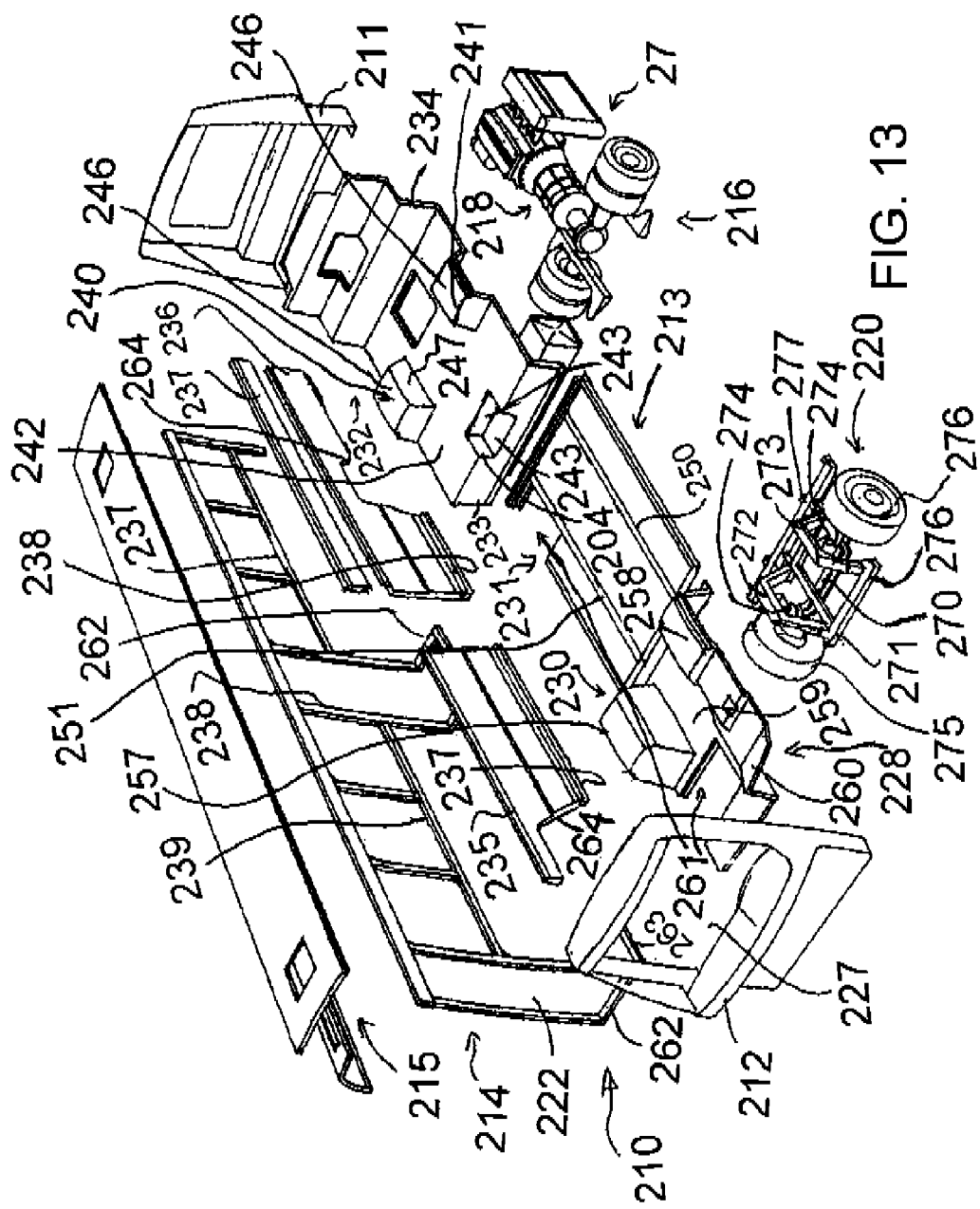
FIG. 13 is an exploded isometric view of a further embodiment of the vehicle.
Figure 14:
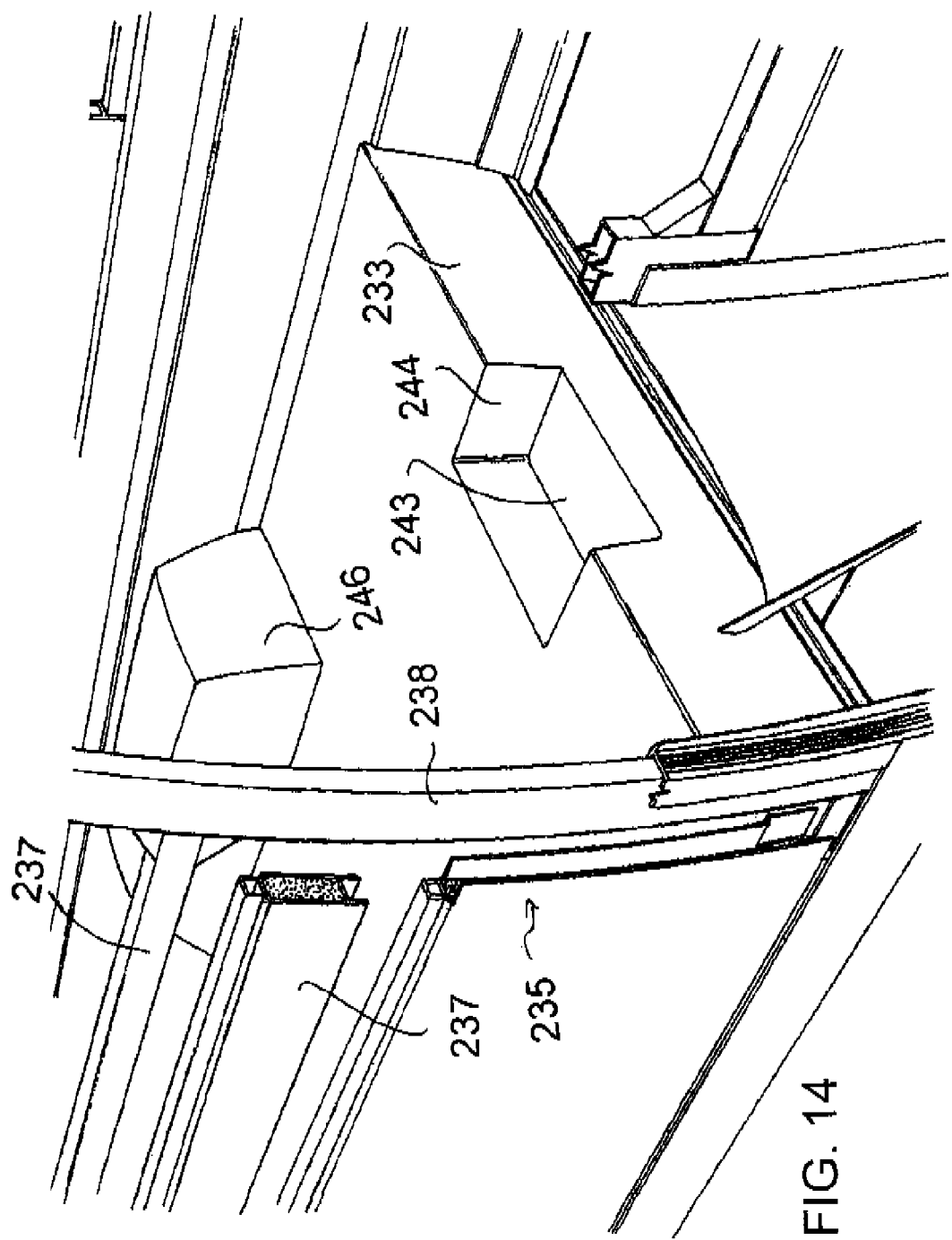
FIG. 14 is an exploded isometric view of a junction between the center floor section and the rear, elevated floor section of the embodiment of FIG. 13.

In FIG. 13 is shown a modified embodiment which utilizes the concepts described above in relation to the previous embodiment in that it utilizes two end caps 211 and 212 together with a floor construction 213 and side frames 214 with the roof construction 215 to form a vehicle 210. The side frame 214 on the curb side of the vehicle includes doors 222 and 238 substantially as previously described. The frame on the second side is not shown but will be absent the doors in most cases since there is no exit on the street side of the vehicle. The vehicle further includes a rear suspension wheel assembly 216 which is connected through a transmission 218 to an engine 217. At the forward end there is a driver console 228 which allows the driver to see through a front screen 227 in the front cap 212. A front suspension 220 is mounted at the front end behind the driver's console.

In this embodiment the floor construction 213 is formed in three separate sections 230, 231 and 232. These are configured to form a low floor bus in that the floor section 230 and 231 is at a low height as close to the ground as possible with the rear section 232 being elevated at a step 233 so as to allow clearance under the rear section 232 for the engine and transmission. At the rearmost end a further step up is indicated at 234 which provides clearance for elevated portions of the engine just in front of the rear cap 211.

In this embodiment the side wall portions 235, 236 and 237 are shown as separate elements which are separate from the floor section. However the construction is substantially similar to that as previously described so that the whole construction can be assembled so that the side portions 235 and 236 engage into the edges of the floor sections using the rails indicated at 237 and 238 which are similar to those previously described.

The piece 237 at the top of the side wall portion 236 is a filler piece which is attached onto the top of the portion 236 to fill the space between the portion 236 and the bottom rail 237 of the rear portion of the side frame 214. This portion 237 is optional since the rail 237 may be arranged at the same height as the rail 239 at the forward part of the side frame 214. In the alternative the portion 237 can be formed integrally with the portion 236.

In this embodiment all of the panels defining the floor sections and the side wall sections together with the roof sections are formed as resin infusion panels. Resin infusion systems are previously known and utilize a system in which a first sheet of a fibre reinforced material is laid onto a support surface following which a core material is applied on top of the sheet and a second sheet is applied on top of the core. Resin is then drawn through the composite structure by applying a vacuum at one location to the structure and allowing the entry of resin into another location on the structure. The vacuum pulled is sufficient to extract air from the system and simultaneously to draw the resin into the system. The resin is thus pulled throughout the whole structure and infuses the whole structure allowing the resin to effect an integration of the core and the top and bottom sheets to form the composite member. In many cases in a complex structure of the type generally shown, a number of vacuum extraction points can be provided and a number of resin introduction points are provided. The core can be shaped to provide required changes in thickness. Additional members can be inserted into the structure such as tubes and other elements which extend wholly along the length of the structure or are inserted as individual elements within the structure at required locations.

The rear section 232 of the floor is formed as an integral member extending from the rear cap 211 forwardly to the riser 233 and across the width of the structure. This element is formed by resin infusion as an integral structure including the down-turned step 233 and including wheel arches 240 and 241 and including the raised rear section 234. These elements are formed onto the floor panel itself which is indicated at 242. In addition a step is formed as indicated at 243 between the raised upstanding section 233 and the floor panel 242 as a cut out element which allows the passengers to step onto a surface 243 between side walls 244 before stepping onto the floor surface 242. Steps of this nature are of course well known but in this case the structure is formed as an integral member including all of these elements. In this way the floor structure provides a sealed surface across the width of the vehicle and along the length of the vehicle thus reducing the possibility for penetration of moisture. The riser 233 acts as a major transverse brace, stiffening the side walls around the door opening. The rear rise 234 similarly provides transverse bracing In particular the wheel arches 240 and 241 are formed as an integral element with the panel 242. Thus the wheel arches include an arched section 246 and an end wall 247. The arch section 246 has a bottom surface facing downwardly toward the wheels and a top surface facing inwardly into the vehicle. The end wall 247 closes the inner end of the arch section 246 and is attached to the floor 242 and its bottom edge. This element is formed so that the sheets of the resin infusion structure extend from the floor panel 242 into the additional elements which are out of the plane of the panel 242 and to hold the core material therebetween so that the core material is common between these elements.

The center section 231 of the floor is similarly formed as an integral structure but in this case it is substantially flat and planar without any of the complexities of the additional upstanding or depending elements of the rear section. The center section 231 is reinforced by longitudinally extending tubes 250 and 251 which are located within the interior of the resin infused structure between the sheets. This construction is shown in more detail in FIG. 17 where the top sheet is indicated at 253, the bottom sheet is indicated at 254 and the core is indicated at 255. In this embodiment a tubular member 256 is inserted between the sheets and replaces the core at that location. The tubular member has sufficient longitudinal strength to take up compression loads along the length of the floor section so as to transfer compression along the floor. It will be appreciated that in vehicles of this type longitudinal compression and tension forces in the floor are common due to acceleration and deceleration of the vehicle. In the absence of such longitudinal members, composite floor structures of this type have difficulty in accommodating the compression forces along the floor. The tubular members 256 are preferably formed as fibre reinforced pultruded members but other structures can also be included. The members are of course attached to the core and to the sheets by the infusion of the resin which acts as an adhesive to integrate the structure. The bottom layer of reinforcement is laid on the mould. Core is laid out on the reinforcement, leaving spaces between the pre-cut panels for the tubes. The top layer of reinforcement is laid over the core and pressed down into the spaces provided between the core for the tubes, creating a glass-lined channel. The tubes are placed in the channel. A strip of reinforcement extending at least 4" to either side of the tubes is placed over the tubes, thus joining the top layer of reinforcement where it is interrupted by the tubes. The whole assembly is then infused with resins, The front driver's section 230 of the floor includes wheel arch members 257 and 258 which are integrally formed with a platform portion 259 in a similar manner to that of the rear section. A driver's plinth 260 is also formed as part of the structure which stands upwardly from the floor panel 259. The wheel arches 257 and 258 are the same general construction as the rear wheel arches but are elevated to a higher level since the floor panel 259 is at a lower height than the floor panels 242.

Both the front floor section and the middle floor section include a cut-out opening 261 at a position adjacent the door. These openings are optional but when present provide a location for a motorized ramp to assist the egress of persons using mobility aids or other structure necessary at the doorway as is well known to a person skilled in the art. In some cases this area receives an incline section assisting the passenger entry.

The opening 261 is surrounded by a frame 262 at the bottom of the doorway 222 and 238 respectively. The frame 262 provides rails and a cross member 263 which connect the bottom of the posts so as to form the ladder structure defining the side panel into a rigid structure able to accommodate bending loads. Thus this structure is rigid across the top rail and rigid across the bottom as defined by the bottom rail at the bottom of the windows and the frame at the bottom of the doorway. Bending of the vehicle about axes across the vehicle is thus resisted by these rigid members forming the side frames.

Figure 15:
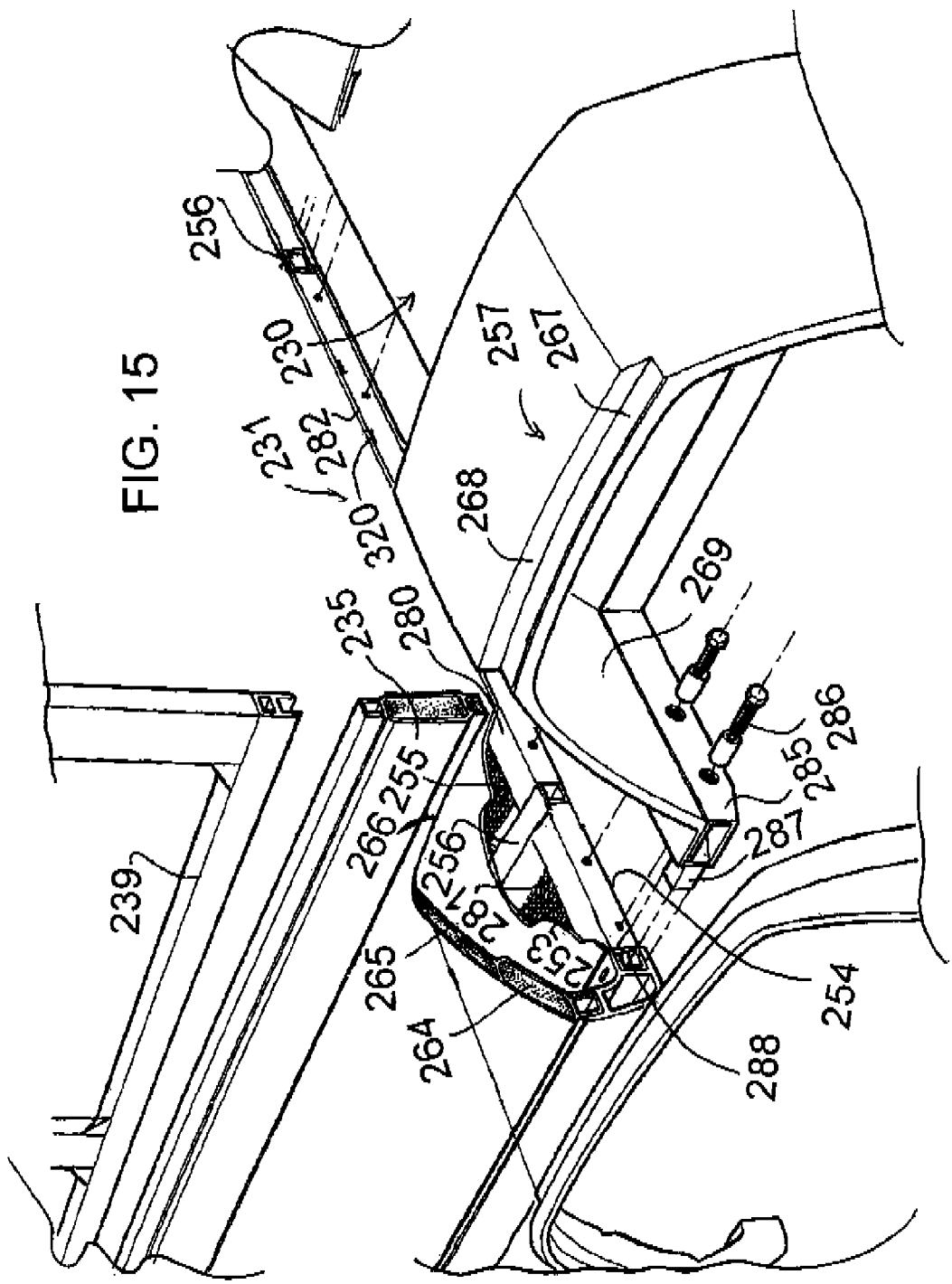
FIG. 15 is an exploded isometric view from one side of a junction between the center floor section and the front floor section of the embodiment of FIG. 13.

The side panels 235 and 236 each include an edge portion 264 which follows the contour of the outside surface of the arch section of the wheel arches. These edge portions 264 thus sit on the wheel arch at the outside surface and are adhesively attached to those wheel arches to integrate the structure of the side walls relative to the floor. This construction is shown in more detail in FIG. 15. Thus in FIG. 15 is shown the side panel 235 which includes a forward edge 264. This forward edge includes a generally upstanding portion 265 and a generally horizontal portion 266 which follow the shape of the wheel arch 257. The wheel arch is shaped with a side cut out portion 267 defining a shoulder 268 which faces the inside surface of the side panel 235. The edge portion 264 sits on the inclined arch section 269 of the wheel arch and extends across the surface 267 against the shoulder 268 at the horizontal portion 266. These surfaces are then bonded together by a suitable adhesive thus assisting in connecting the side wall to the floor at the wheel arches. The fact that the wheel is integral with the floor panel prevents the penetration of moisture through the floor around the wheel arch. The connection of the side panel 235 to the outside surface of the wheel arch provides an effective connection at that location to transfer loads originating from the suspension passing into the wheel arch and from the wheel arch into the side walls.

In FIG. 13, a front suspension member is indicated at 220 which includes an axle 270 and support frame 271 for the axle. The support frame 271 includes two arch members 272 and 273 which stand upwardly above the axle. Between the top member of the arch and the axle is provided a suspension element 274 of a conventional nature. Thus the axle is supported in this frame structure underneath the arch members 272 and 273 with the wheels 275 and 276 attached conventionally at the end of the axle. The frame 271 includes a front cross member 276 and a rear cross member 277. The arch members 272 and 273 are shaped to match the underside of the wheel arches 257 and 258. Ideally, to simplify the weldment, the interfacing surfaces of the wheel arches can be formed to match the arch members 272 and 273. Thus each includes a generally upstanding section and a transverse section generally matching the shape shown in FIG. 15. Thus the outside surface of the arch members 272 and 273 abuts the under surface of the wheel arches. This allows these members to be attached to the wheel arches to transmit load from suspension into the body structure through those wheel arches. The wheel arches themselves are part of the floor structure and are connected to the side walls as previously described so that the load from the suspension can be applied into the body at least partly through this interconnection with the wheel arch.

The rear element 277 numbered as 285 in FIG. 15 shows element 277 connected to the floor. This is the rear element of the suspension assembly and connects directly to the stiffening beam 280, at the leading edge of the floor assembly.

A similar mounting arrangement can be provided between the rear assembly 216 and the wheel arches 246. However in this area additional connections are required so as to connect the engine and transmission into the vehicle to provide structural support for the engine and transmission relative to the body. These elements are not shown as they are of a conventional nature and well known to one skilled in the art.

Turning now to FIG. 15, there is shown the connection between the forward end of the center floor section 231 and the rear end of the front floor section 230. At this connection there is provided a transverse stiffening beam 280 which is mounted in the floor structure between the top sheet 253 and the bottom sheet 254. This transverse stiffening beam is located in a recessed portion of the core 255 so that a front edge 281 of the core butts against the rear edge of the stiffening member 280. The front edge of the stiffening member 280 is located at the front edge 282 of the sheets. This stiffening member cooperates with a similar stiffening member 285 which is provided at the rear edge of the front floor section 230. This stiffening member is actually part of the suspension. The front floor sits on it and is bonded to it. These stiffening members are held together by inserted bolts 286 and by pegs 287 in which it engage into recesses 288. Thus at the connection between the floor sections there is a transverse stiffening member and which also allows effective connection of loads longitudinally between the floor sections. The transverse stiffening members 280 and 285 are attached into the floor structure as an integral member so that they are resistant to being pulled out of the floor structure by loads longitudinally of the floor structure.

Figure 16:
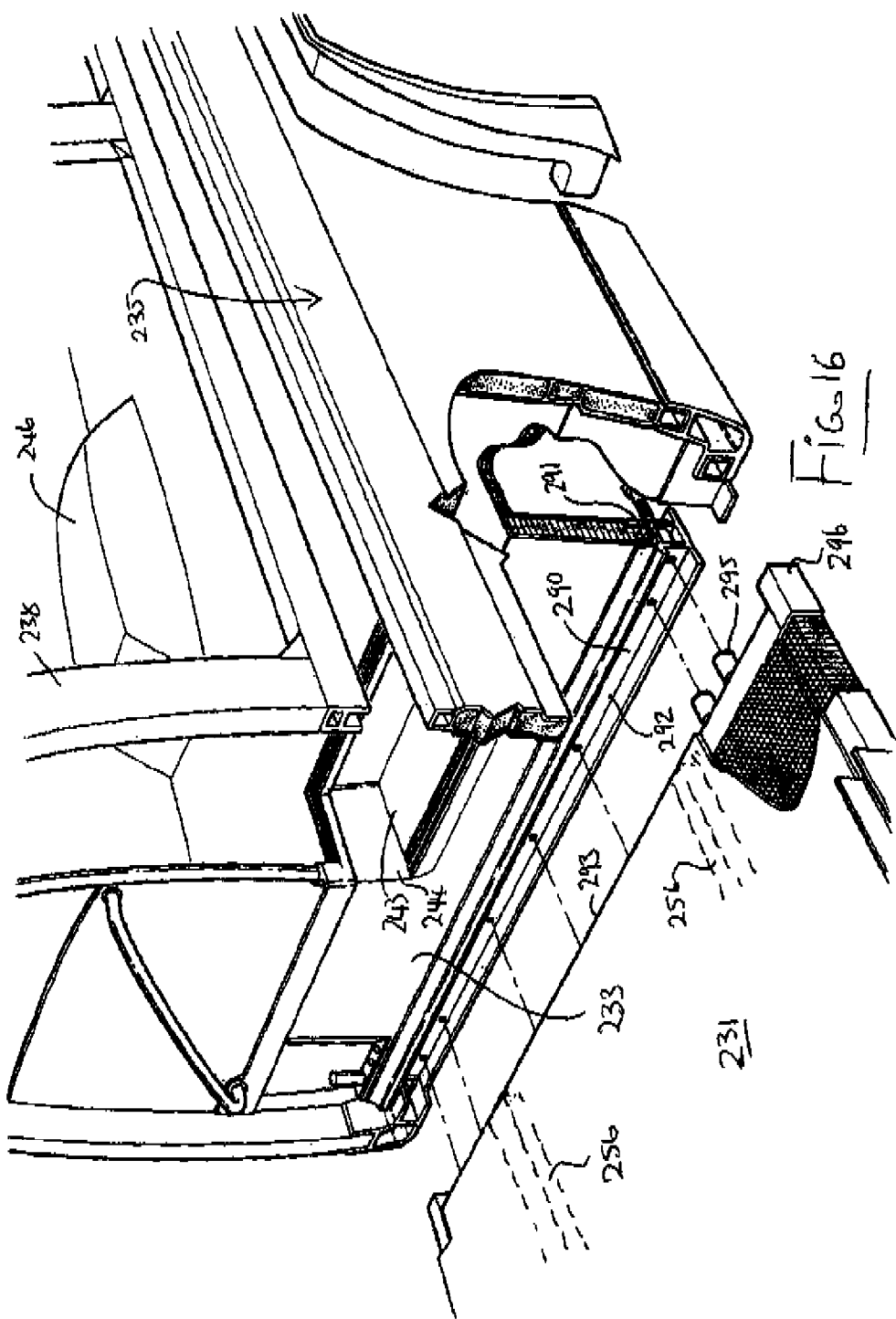
FIG. 16 is an exploded isometric view from the other side of a junction between the center floor section and the rear floor section of the embodiment of FIG. 13.

In FIG. 16 is shown the connection between the rear end of the center floor section 231 and the bottom of the riser 233 of the rear floor section. Thus at the bottom of the rear floor section is provided a rail 290 into which is inserted a bottom edge of the step portion 233 in a channel portion 291 of that rail. The rail is shaped to form a channel section 292 facing forwardly for receiving the rear edge 293 of the floor section 231. Again bolts 295 and pegs 296 can be provided to engage into cooperating elements in the rail 290.

In FIG. 17 is shown an alternative joint connection to replace the channel type joint connections previously described. Thus in this embodiment the wall section 235 of the floor section engages into a rail 300 at the junction between the wall section and the floor panel and engages into a rail 301 at the bottom of the side frame 214. In this embodiment the wall portion 235 includes a flange 303 at its bottom end and a flange 304 at its upper end. These flanges are arranged longitudinally along the full length of the wall section 235. Thus the flange 303 is arranged on the outside surface 305 of the panel 235 and forms an extension of the outer skin. The flange 304 is formed on the inside surface 306 of the panel 235 and forms an extension of the inner skin. The rail 300 includes a web 307 and an interior flange 308. Symmetrically the rail 301 includes a web 309 and an exterior flange 310. In this way in effect each of the rails 300 and 301 forms a Z-shaped connection with the corresponding edge of the panel 235. The webs 307 and 309 are inclined at an angle different from 90° and extending so that the flanges 303 and 308 at the rail 300 are spaced apart in a direction parallel to the flanges. In this way the bottom edge of the panel 235 can be brought to the upper edge of the rail 300 and moved inwardly toward the interior of the vehicle thus acting in effect simultaneously to bring the flange 303 against the outside surface of the rail 300 and to bring the inside surface of the panel into engagement with the outside surface of the flange 308 and in addition to bring the edge surface of the panel into engagement with the web 307 of the rail 300. As these engagements are effected by an inward movement, adhesive located between these surfaces can be simultaneously compressed without the necessity for any sliding action such as may occur when an edge portion is inserted into a channel. In this way there is less necessity to provide accurate tolerances since there is a reduced tendency for adhesive to be wiped or swept away from the surfaces. Any additional adhesive is merely compressed and squeezed out. Any shortage of adhesive can be accommodated by the compression of adhesive from other areas.

A symmetrical arrangement is provided by the flanges 304 and 310 and the web 309 at the upper edge of the panel 235 relative to the rail 301. In this location the movement of the panel relative to the rail 301 is an outward direction. It will be appreciated that the same arrangement can be reversed allowing the panel to be inserted between the rails 300 and 301 from the outside direction inwardly if this is preferred. The selection of the arrangements of the flanges in this connection can be made depending upon the order of assembly of the components. Thus the rail 301 which forms part of the ladder structure along the side can be inserted as the last element in the structure which is inserted between the panel 235 and the coping panel previously described of the roof structure.

In this embodiment the rail 301 is connected to the posts indicated at 311 by a bolted connection. This can also be a bonded connection and in some ways is better as a bonded connection as indicated at 312. The bolted connection includes a coupling portion 313 which attaches onto the top of the rail 301. Suitable coupling arrangements and bolted connections of this type can replace the welded connections previously described and shown in other figures.

Also shown in FIG. 17 is a series of current collecting conductors 320 which are contained within the floor section 231 and the panel 235. Thus each of the panels of the structure of the vehicle contains series of current collecting conductors which extend longitudinally of each panel along the full length of the panel and has an exposed end arranged at one or both ends of the panel for connection to a suitable grounding conductor. In the arrangement of FIG. 15, the conductors 320 are shown extending along the panel 231 and emerge at the forward end of that panel for engagement with the transverse stiffening member 280. Each of these current collectors therefore connects to the metal stiffening member 280 and allows any current flowing in the panels to be communicated to the end of the panel where the connection to a metal member allows the current to be drained to ground through suitable additional conductors.

It will be appreciated that one significant problem of vehicles formed from composite material that they can generate significant levels of static electricity which must be allowed to dissipate through the current collection conductors for connection to grounded members of the vehicle. In the example shown, the current collectors 320 are formed as part of the panels simply as a conductive tape laid onto the core 255 prior to the application of the upper skin 253. However additional current collector conductors can be provided adjacent the outer skin or the conductors may be provided within the body of the core depending upon the surface from which static electricity is intended to be conducted.

Figure 18:
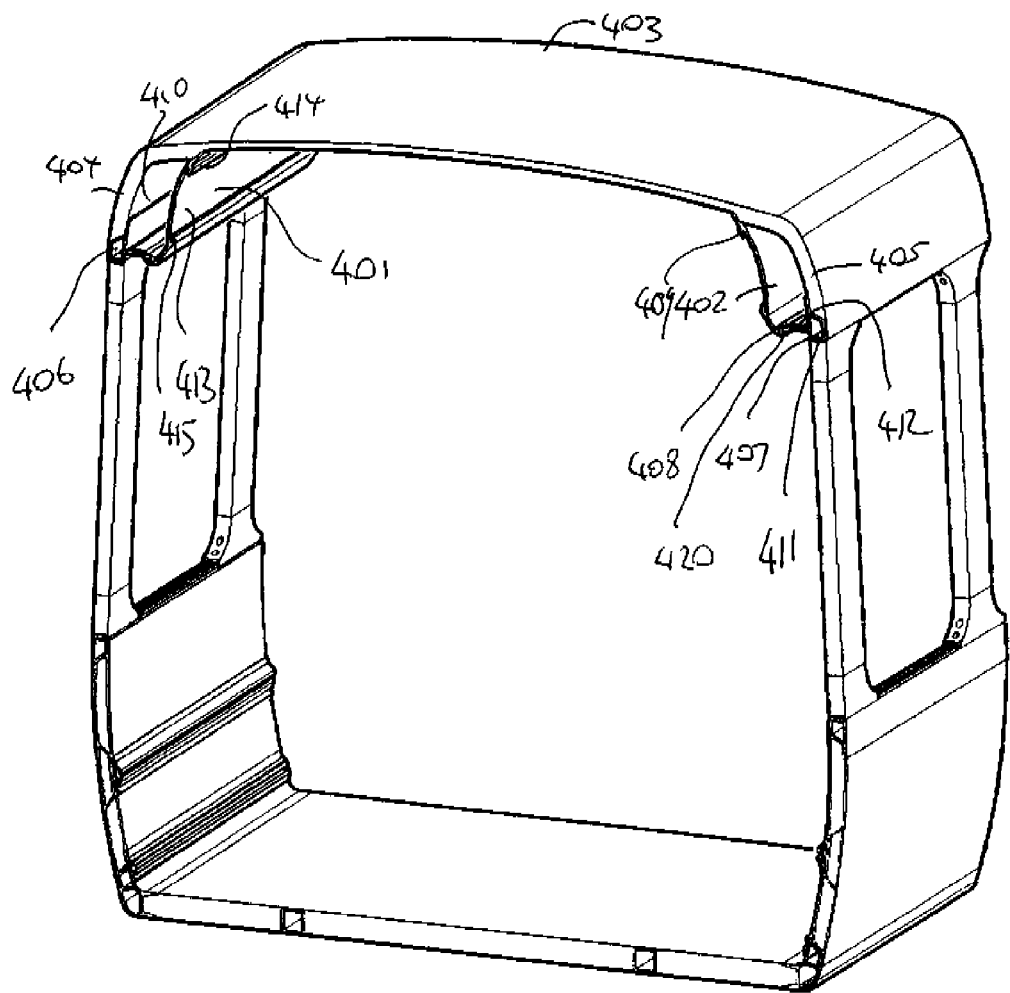
FIG. 18 is an isometric view one portion of the vehicle according to the present invention including an additional cove reinforcement wall.

In FIG. 18 is shown an additional cove reinforcement wall arrangement. While the arrangement shown in FIG. 3 which uses only an inverted "U" shape is strong in the vertical mode, the additional cove reinforcement adds requisite beam strength over the windows and especially in the multiple door openings where some vehicles will have doors on both sides.

The corner cove reinforcement forms a tube with the outer roof cove is made in two pieces as it is impossible to mold without a foam mandrel of some sort, which would then block the cavity between the inner and outer coves, defeating its secondary function as a duct for conditioned air. Either the inner or the outer cove piece is thus bonded into the structure.

Thus in the arrangement of FIG. 18, the roof section is formed with a generally horizontal central roof section 403 and two depending cove portions 404 and 405. Each cove portion attaches at its lower edge to a respective one of the rails 406, 407 at the top of the side walls sections previously described. Two cove stiffening walls 401 and 402 are provided along the respective cove portions each having a bottom edge 408 adhesively attached along the vehicle at a position adjacent a bottom edge of a respective one of the depending cove portions and having a top edge 409 adhesively attached along the vehicle at a position adjacent a respective outer edge of the horizontal roof portion so as to define a channel 410 between the cove stiffening wall and the respective cove portion. The channel can act as a duct for wiring and/or air flow.

Each side wall section includes a metal top rail 411 which is attached to the bottom edge of the respective cove portion. Each rail 411 has in unturned generally horizontal flange 412 integrally formed with the rail and the cove stiffening wall is attached along its bottom edge to the flange 412.

The cove stiffening wall includes a receptacle channel 413 therealong defined by slots 414 and 415 for receiving an advertising strip.

The cove stiffening wall may have openings 420 along a bottom edge thereof so as to allow escape of air from the channel so that the channel can act as an air conditioning transportation duct.

The cove stiffening wall is thus rigidly and fixedly attached along its top and bottom edges by bonding an edge strip to a co-operating strip along the cove portion where the strips are parallel and overlying. This provides a tubular reinforcement of a structural nature with the tube communicating forces through the adhesive joints along the vehicle to provide the desired strength for roll-over resistance and bending stiffness.

As an alternative, a large hollow pultrusion can be used in the cove area of the roof in replacement for the integral cove portions of the roof section, immediately above the windows to form a three piece roof construction.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A vehicle comprising:
a roof defined by at least one roof section;
a floor defined by at least one floor section;
two side wall sections each defining a series of window openings in a row along the side wall section;
each side wall section comprising an integral substantially rigid metal ladder structure defined by vertical posts and horizontal rails with openings in the ladder structure between at least some of the posts and some of the rails defining the window openings;
said at least one roof section comprising a structural member which is generally of inverted channel shape to define a generally horizontal roof portion and two depending cove portions, one on each side of the roof portion;
said at least one roof section being formed at least primarily from inner and outer fiber reinforced sheets containing a core material therebetween formed into an integral structure by a resin material therein;
said at least one floor section defining a structural member which is generally channel shaped to define a generally horizontal floor portion and two generally upstanding wall portions, one on each side of the floor portion;
at least the floor portion of said at least one floor section being formed at least primarily from inner and outer fiber reinforced sheets containing a core material therebetween formed into an integral structure by a resin material therein;
a top edge of each wall portion being attached by a respective adhesive structural connection to a bottom rail of the respective one of the side wall sections such that structural loads in the vehicle are communicated between said at least one floor section and the side wall sections through said adhesive structural connections;
a bottom edge of each cove portion being attached by a respective adhesive structural connection to a top rail of the respective one of the side wall sections such that structural loads in the vehicle are communicated between the roof section and the side wall sections through the structural connections.

2. The vehicle according to claim 1 wherein said at least one floor section is connected across the vehicle from the side wall sections so as to transfer loads therebetween with no transverse structural metal rails providing structural support for said at least one floor section between a front and rear end of said at least one floor section.

3. The vehicle according to claim 1 wherein said at least one floor section is formed from a front floor section and a rear floor section, the front floor being connected across the vehicle from the side wall sections so as to transfer loads therebetween with no transverse structural metal rails providing structural support for said front floor section between a front and rear end of said front floor section, and the rear floor being connected across the vehicle from the side wall sections so as to transfer loads therebetween with no transverse structural metal rails providing structural support for said rear floor section between a front and rear end of said rear floor section.

4. The vehicle according to claim 1 wherein said at least one floor section includes a longitudinal stiffening member between each wall portion and a respective side edge of the floor portion.

5. The vehicle according to claim 4 wherein each longitudinal stiffening member comprises a rail having a first channel portion thereof adhesively connected to a tongue portion of the floor portion and having a second channel portion thereof adhesively connected to a tongue portion of the wall portion.

6. The vehicle according to claim 1 wherein said at least one floor section includes at least one longitudinal stiffening member in the floor portion.

7. The vehicle according to claim 1 wherein the top rail extends along the top of the windows and the bottom rail extends along the bottom of the windows and are spaced substantially by the height of the windows.

8. The vehicle according to claim 1 wherein at least one of the roof section and the floor portion and wall portion of said at least one floor section are formed as resin infusions.

9. The vehicle according to claim 1 wherein the adhesive structural connections are arranged such that the adhesive releases its bond by heating to a release temperature such that the roof section and/or said at least one floor section can be separated from the metal rail by heating the adhesive to its release temperature.

10. The vehicle according to claim 9 wherein there are provided heating wires embedded in the section adjacent the rail for heating the section at the rail.

11. The vehicle according to claim 1 wherein on at least one side of the vehicle the side wall section includes a door between two of the posts and a window in each of the openings between the others of the posts.

12. The vehicle according to claim 1 wherein there is provided at each side a first rail between the wall portion and the floor portion and there are no structural metal posts between the bottom rail of the ladder structure and the first rail.

13. The vehicle according to claim 1 wherein the ladder structure is formed from frame members which are welded together to form the integral structure.

14. The vehicle according to claim 1 wherein the ladder structure is formed from frame members which are bolted or coupled together using a rigid system to ensure that the ladder structure is able to transfer bending loads along the vehicle.

15. A vehicle comprising:
at least one roof section;
at least one floor section;
a side wall section defining a series of window openings in a row along the side wall section;
the side wall section comprising an integral substantially rigid metal ladder structure defined by vertical posts, a horizontal bottom rail and a horizontal top rail with openings in the ladder structure between at least some of the posts and some of the rails defining the window openings;
said at least one roof section comprising a structural member including a generally horizontal roof portion and a depending cove portions;
said at least one roof section being formed at least primarily from inner and outer fiber reinforced sheets containing a core material therebetween formed into an integral structure by a resin material therein;
said at least one floor section comprising a generally horizontal floor portion and a generally upstanding wall portion;
said generally horizontal floor portion and a upstanding wall portion of said at least one floor section being formed at least primarily from inner and outer fiber reinforced sheets containing a core material therebetween formed into an integral structure by a resin material therein;
a metal rail having a first channel portion thereof adhesively connected to a tongue portion of the floor portion and having a second channel portion thereof adhesively connected to a tongue portion of the wall portion;
a top edge of the wall portion being attached by an adhesive structural connection to the bottom rail of the side wall section such that structural loads in the vehicle are communicated between said at least one floor section and the side wall section through said adhesive structural connections;
a bottom edge of the cove portion being attached by an adhesive structural connection to the top rail of the side wall section such that structural loads in the vehicle are communicated between the roof section and the side wall section through the structural connection;
wherein there are no structural metal posts between the bottom rail of the ladder structure and the metal rail.

16. The vehicle according to claim 15 wherein said at least one floor section includes at least one longitudinal stiffening member in the floor portion.

17. The vehicle according to claim 15 wherein the adhesive structural connections are arranged such that the adhesive releases its bond by heating to a release temperature such that the roof section and/or said at least one floor section can be separated from the metal rail by heating the adhesive to its release temperature.

* * * * *